United States Patent
Agiwal et al.

(10) Patent No.: US 11,140,699 B2
(45) Date of Patent: Oct. 5, 2021

(54) METHOD AND APPARATUS FOR UPLINK SCHEDULING ON LOGICAL CHANNEL PRIORITY IN MOBILE COMMUNICATION SYSTEM

(71) Applicant: Samsung Electronics Co., Ltd, Suwon-si (KR)

(72) Inventors: Anil Agiwal, Suwon-si (KR); Jungmin Moon, Suwon-si (KR); Seunghoon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/971,737

(22) Filed: May 4, 2018

(65) Prior Publication Data

US 2018/0324835 A1    Nov. 8, 2018

(30) Foreign Application Priority Data

May 4, 2017   (KR) .................. 10-2017-0056806

(51) Int. Cl.
*H04W 72/12*  (2009.01)
*H04W 72/04*  (2009.01)
*H04W 72/14*  (2009.01)

(52) U.S. Cl.
CPC ... *H04W 72/1268* (2013.01); *H04W 72/0453* (2013.01); *H04W 72/1242* (2013.01); *H04W 72/14* (2013.01)

(58) Field of Classification Search
CPC . H04L 2012/5608; H04L 47/10; H04L 47/35; H04L 47/30; H04L 47/32;
(Continued)

(56) References Cited

U.S. PATENT DOCUMENTS

2012/0120880 A1*  5/2012  Lee ................... H04W 72/02
                                                          370/329
2013/0051334 A1   2/2013  Sammour et al.
(Continued)

FOREIGN PATENT DOCUMENTS

EP     3562234 A1     10/2019
WO  2016/182345 A1    11/2016
WO  2018/200632 A1    11/2018

OTHER PUBLICATIONS

International Search Report dated Aug. 28, 2018 in connection with International Patent Application No. PCT/KR2018/005231, 3 pages.

(Continued)

*Primary Examiner* — Brenda H Pham

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. According to the present disclosure, a terminal can perform uplink scheduling in accordance with a priority of a logical channel in a mobile communication system supporting various numerology types and TTI durations.

16 Claims, 20 Drawing Sheets

(58) Field of Classification Search
CPC ..... H04W 84/12; H04W 88/08; H04W 80/04; H04W 88/06; H04W 84/18; H04W 74/08; H04W 8/26; H04W 72/04; H04W 36/30; H04W 36/24; H04W 76/00; H04W 76/02; H04W 84/08; H04B 7/2123; H04B 7/212
USPC .... 370/310.2, 328, 338, 349, 235, 322, 329, 370/332, 341
See application file for complete search history.

(56) References Cited

U.S. PATENT DOCUMENTS

| | | | | |
|---|---|---|---|---|
| 2015/0230234 | A1* | 8/2015 | Choi | H04B 7/0417 370/329 |
| 2017/0272200 | A1* | 9/2017 | Dinan | H04W 72/042 |
| 2017/0318594 | A1* | 11/2017 | Babaei | H04W 72/087 |
| 2018/0077696 | A1* | 3/2018 | Lee | H04W 74/0833 |
| 2018/0249509 | A1* | 8/2018 | Yi | H04W 48/18 |
| 2018/0279358 | A1* | 9/2018 | Babaei | H04W 72/0453 |
| 2018/0310308 | A1* | 10/2018 | Loehr | H04W 72/0446 |
| 2018/0324768 | A1* | 11/2018 | Shaheen | H04W 72/0446 |
| 2019/0124684 | A1* | 4/2019 | Folke | H04W 72/14 |
| 2019/0159229 | A1* | 5/2019 | Yi | H04L 5/001 |
| 2019/0364586 | A1 | 11/2019 | Li et al. | |

OTHER PUBLICATIONS

Qualcomm Incorporated, "Logical channel prioritization in NR with multiple numerologies/TTIs", Apr. 3-7, 2017, 3GPP TSG-RAN WG2 Meeting #97bis, 2 pages, R2-17xxxx.

Ericsson, "Logical Channel Prioritization with short TTI", 3GPP TSG-RAN WG2 #97bis, Apr. 3-7, 2017, 3 pages, Tdoc R2-1703210.

InterDigital Communications, "Logical Channel Prioritization for NR", 3GPP TSG-RAN WG2 #97bis, Apr. 3-7, 2017, 4 pages, R2-1702871.

MediaTek Inc., "Enhancements to logical channel prioritization", 3GPP TSG-RAN WG2 #97bis, Apr. 3-7, 2017, 5 pages, R2-1703519, Revision of R2-1701709.

Lenovo et al., "LCP procedure with multiple numerologies", 3GPP TSG-RAN WG2 Meeting #97bis, Apr. 3-7, 2017, R2-1703153, 2 pages.

Huawei et al., "LCP with Multiple Numerologies", 3GPP TSG-RAN WG2 #97bis, Apr. 3-7, 2017, R2-1702602, 4 pages.

Samsung, "The Details of LCP for Supporting Multiple Numerologies/TTIs", 3GPP TSG RAN WG2 #97bis, Apr. 3-7, 2017, R2-1703716, 3 pages.

Ericsson, "Impacts on the UL grant and LCP of different numerologies and flexible TTI duration", 3GPP TSG-RAN WG2 #96, Nov. 14-18, 2016, Tdoc R2-168659, 4 pages.

Supplementary European Search Report dated Feb. 28, 2020 in connection with European Patent Application No. 18 79 4332, 12 pages.

* cited by examiner

METHOD AND APPARATUS FOR UPLINK SCHEDULING ON LOGICAL CHANNEL PRIORITY IN MOBILE COMMUNICATION SYSTEM

CROSS-REFERENCE TO RELATED APPLICATION AND CLAIM OF PRIORITY

This application is based on and claims priority under 35 U.S.C. § 119 to Korean Patent Application No. 10-2017-0056806 filed on May 4, 2017 in the Korean Intellectual Property Office, the disclosure of which is incorporated herein by reference in its entirety.

BACKGROUND

1. Field

The present disclosure relates to an uplink transmission operation of a terminal in a mobile communication system. More particularly, the present disclosure provides a method and an apparatus for determining which logical channel data belongs to is to be transmitted and in what size the data is to be transmitted when the system supports various types of numerologies and transmission time interval (TTI) duration.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In a 5G new radio (NR) recently studied, various types of numerologies types and transmission time interval (TTI) durations are supported, and thus it is useful to consider the type of numerology and TTI duration supported by respective logical channels during uplink (UL) transmission of a terminal.

SUMMARY

In general, a long term evolution (LTE) base station uses one type of numerology and TTI duration in an uplink (UL). Accordingly, it is not necessary to select a logical channel for transmission in consideration of the type of numerology and TTI duration during UL transmission. Further, in determining a bucket size for each logical channel in a logical channel prioritization operation, one type of TTI duration should be considered. However, in the 5G new radio (NR), various types of numerologies and TTI durations are supported. Accordingly, a terminal should consider the numerologies and TTI durations supported by respective logical channels when performing a UL transmission. The present disclosure provides a method by a terminal for performing a logical channel prioritization in consideration of various types of numerologies and TTI durations.

In accordance with a first aspect of the present disclosure, a method of a terminal for transmitting uplink data is provided. The method includes receiving information on mapping restrictions for a plurality of logical channels from a base station, receiving an uplink grant from the base station, selecting a logical channel from the plurality of logical channels based on the information on mapping restrictions and the uplink grant, and transmitting uplink data based on the selected logical channel to the base station.

In accordance with a second aspect of the present disclosure, a method of a base station for receiving uplink data is provided. The method includes transmitting information on mapping restrictions for a plurality of logical channels to a terminal, transmitting an uplink grant to the terminal, and receiving uplink data based on a logical channel selected from the plurality of logical channels based on the information on mapping restrictions and the uplink grant.

In accordance with a third aspect of the disclosure, a terminal for transmitting uplink data is provided. The terminal includes a transceiver and a controller coupled with the transceiver. The transceiver is configured to receive signals from a base station and to transmit signals to the base station. The controller is configured to control the transceiver to receive information on mapping restrictions for a plurality of logical channels from a base station, control the transceiver to receive an uplink grant from the base station, select a logical channel from the plurality of logical channels based on the information on mapping restrictions and the uplink grant, and control the transceiver to transmit uplink data based on the selected logical channel to the base station.

In accordance with a fourth aspect of the disclosure, a base station for receiving uplink data is provided. The base station includes a transceiver and a controller coupled with the transceiver is provided. The transceiver is configured to receive signals from a terminal and to transmit signals to the terminal. The controller is configured to control the transceiver to transmit information on mapping restrictions for a plurality of logical channels to a terminal, control the transceiver to transmit an uplink grant to the terminal, and control the transceiver to receive uplink data based on a logical channel selected from the plurality of logical channels based on the information on mapping restrictions and the uplink grant.

By using the bucket management method for each logical channel provided in the present disclosure, it is possible to prevent a situation in which data belonging to a specific logical channel is transmitted with an unfairly small size as compared with data belonging to other logical channels.

Further, when various types of numerologies and TTI durations are used in a mobile communication system, a terminal can effectively select a logical channel to be transmitted using a UL resource allocated from a base station.

Further, when a specific UL resource is allocated to a terminal through definition of an index prescribing the characteristic of a UL resource, it is possible to select a logical channel more suitable to the corresponding UL resource among a plurality of logical channels to perform a UL transmission.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
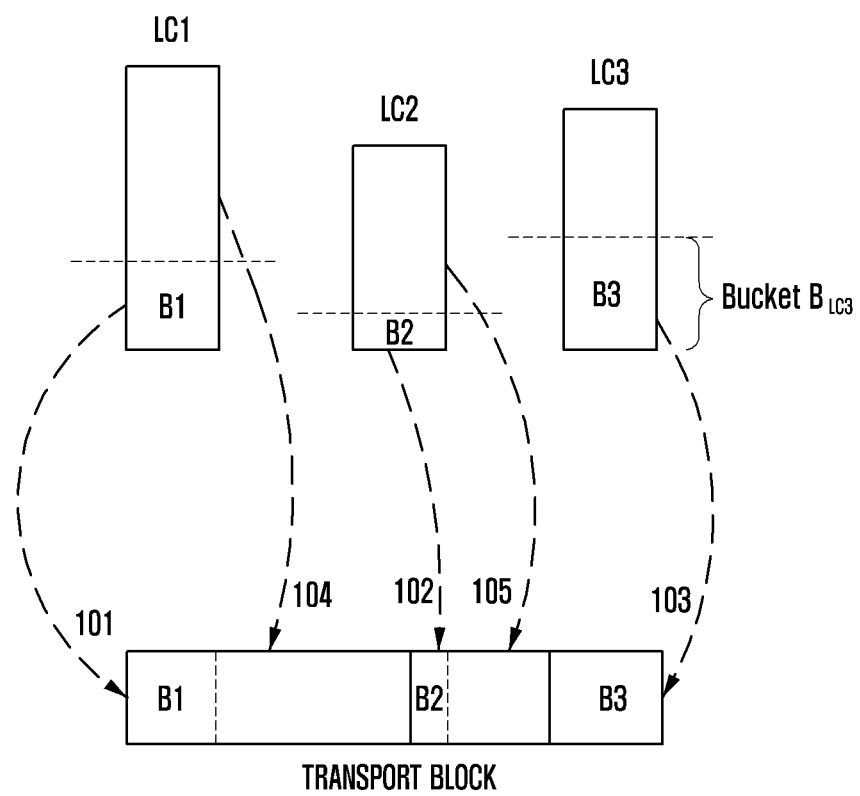
FIG. 1 is a diagram exemplarily illustrating a basic LCP operation.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), or 5G NB (5GNB).

The "UE" is an entity communicating with a BS and may be referred to as the UE, device, mobile station (MS), mobile equipment (ME), or terminal.

Although embodiments of the present disclosure will be described in detail in a state where a 5G new radio (NR) system becomes the main object, the primary gist of the present disclosure can also be applied to other communication systems having similar technical backgrounds or channel types through slight modifications thereof in a range that does not greatly deviate from the scope of the present disclosure by the judgment of those skilled in the art to which the present disclosure pertains.

The present disclosure proposes a logical channel prioritization (LCP) operation that is suitable in case where a base station and a terminal use various types of numerologies or transmission time interval (TTI) durations. For this, a logical channel prioritization (LCP) operation of long term evolution (LTE) in which a base station and a terminal use one type of numerology and TTI will be first described.

FIG. 1 is a diagram illustrating an LCP operation in an LTE system in which a base station and a terminal use one type of numerology and TTI. In an example of FIG. 1, three (3) logical channels (LCHs) are allocated to one transport block, and priorities among the LCHs are configured in the order of LCH 1, LCH 2, and LCH 3. In FIG. 1, the height of a bar graph means a traffic size for each LCH, and the traffic size indicated below dotted lines means the size of a bucket (B) of each LCH. In such a situation, the LCP of LTE operates as follows.

1. Traffic of LCH 1 having the highest priority among LCHs is allocated to a given transport block as much as the bucket size B1 (101).

2. Traffic of LCH 2 having the priority next to that of LCH 1 is allocated to a given transport block as much as the bucket size B2 (102).

3. Traffic of LCH 3 having the lowest priority is allocated to a given transport block as much as the bucket size B3 (103).

4. If there exists a remaining resource in a given transport block after traffic as much as the bucket size of LCHs is allocated to the transport block, all the remaining traffic of the respective LCHs is allocated to the transport block in the order of their priority. Specifically, all the remaining traffic of LCH 1 is allocated to the transport block (104).

5. All the remaining traffic of LCH 2 having the priority next to that of LCH 1 is allocated to a given transport block (105).

6. Such an operation is repeated until all the remaining resource in a given transport block vanishes completely.

In general, the LCP operation in the LTE system is composed of two operations. At the first operation, traffic corresponding to the bucket size for each LCH is allocated to a transport block in the order of priority, and at the second operation, the remaining traffic on each LCH is allocated to the transport block in the order of priority. Through such an operation, an opportunity to transmit the traffic as much as at least the bucket size is given before all the given transport blocks vanish completely even in case of the LCH having a low priority. This serves to increase fairness among the LCHs.

According to 3GPP TS 36.321 specification defining media access control (MAC) layer operations of LTE, the bucket size of each LCH is determined as follows.

The MAC entity shall maintain a variable Bj for each logical channel j. Bj shall be initialized to zero when the related logical channel is established, and incremented by the product PBR×TTI duration for each TTI, where PBR is a prioritized bit rate of logical channel j. However, the value of Bj cannot exceed the bucket size and if the value of Bj is larger than the bucket size of logical channel j, it shall be set to the bucket size. The bucket size of a logical channel is equal to PBR×BSD, where PBR and BSD are configured by upper layers.

This can be summarized as follows.

If LCH j is established for a terminal, the bucket size Bj of LCH j is preferentially initialized to zero (0).

Thereafter, Bj is increased as much as PBR×TTI for each TTI.

As the TTI is increased, Bj is also increased, and if Bj exceeds PBR×BSD, Bj is limited to PBR×BSD. In the present disclosure, Bj is called a bucket size, and PBR×BSD that is the maximum value of Bj is called the maximum bucket size. Here, PBR and BSD are abbreviations of a prioritized bit rate and a bucket size duration, respectively.

Figure 2:
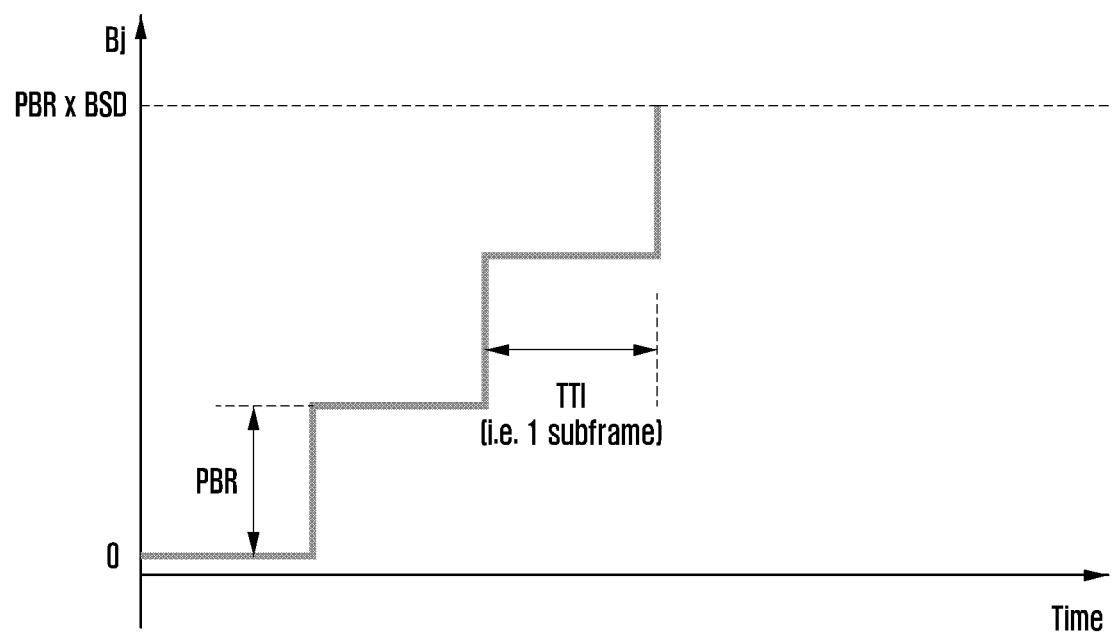
FIG. 2 is a diagram exemplarily illustrating update of a Bj value for LCH j in an LTE system in which 1 TTI corresponds to 1 subframe.

FIG. 2 is a diagram illustrating a change of a bucket size Bj according to time for a logical channel LCH j in an LTE system in which 1 TTI corresponds to 1 subframe.

In an LTE system, TTI corresponds to 1 subframe. Accordingly, at a time when LCH j is established, Bj corresponds to 0, and then Bj is increased as much as PBR whenever 1 subframe passes. Further, if Bj reaches PBR×BSD, Bj is maintained as the maximum bucket size. In this manner, the terminal allocates traffic to a transport block given during an LCP operation based on a Bj value for each LCH j.

In the LTE system before Short TTI (sTTI) is introduced, 1 TTI corresponds to 1 subframe, that is, 1 ms. Accordingly, Bj of LCH j is updated every 1 ms. However, in a 5G new radio (NR), 1 TTI may have various durations. For example, in the NR system, 1 TTI may have duration of 1 ms, 0.5 ms, 0.25 ms, 0.125 ms, 1 symbol, or 2 symbols. Further, traffic corresponding to one LCH may be transmitted through a physical resource having various types of numerologies or TTI durations. For example, traffic corresponding to LCH I may be transmitted through a physical resource corresponding to 1 ms or 0.5 ms, and traffic corresponding to LCH j may be transmitted through a physical resource corresponding to 0.5 ms, 0.25 ms, or 0.125 ms. Such a corresponding relationship between the LCH and numerology or TTI is achieved through radio resource control (RRC) layer signaling.

If traffic corresponding to a specific LCH j, unlike the LTE system, can be transmitted through a physical resource having various TTI duration values, it is useful to consider what influence is exerted on Bj.

Figure 3:
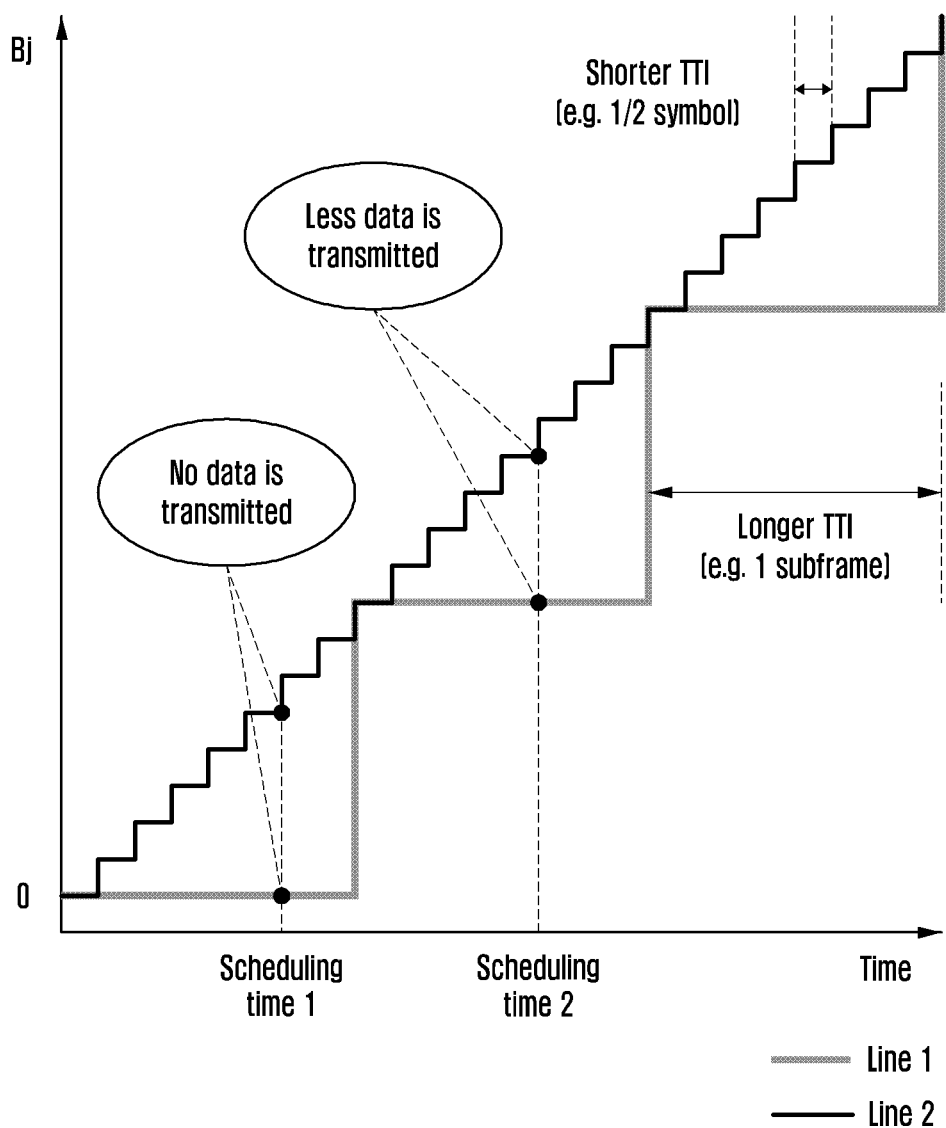
FIG. 3 is a diagram illustrating an influence exerted on Bj when specific LCH j can be transmitted through a resource having a longer TTI and a shorter TTI.

FIG. 3 illustrates a change of Bj according to time in case where it is possible to transmit traffic corresponding to a specific logical channel LCH j through a physical resource having two TTI durations of a long TTI and a short TTI.

In an example of FIG. 3, traffic corresponding to LCH j may be transmitted based on a longer TTI (e.g., 1 subframe) or a shorter TTI (e.g., 1/2 symbol). Line 1 means Bj that is updated based on the longer TTI, and Line 2 means Bj that is updated based on the shorter TTI. During the LCP operation, if the terminal applies Bj that is updated based on the longer TTI instead of Bj that is updated based on the shorter TTI, it may cause the following drawbacks.

The Bj value just after establishment of LCH j is 0. If the Bj is updated based on the longer TTI, the Bj value escapes from 0 later than a case where the Bj value is updated based on the shorter TTI. That is, if Bj is updated based on the short TTI, the Bj value escapes from 0 earlier. Accordingly, if Bj is updated based on the shorter TTI (Line 1) at scheduling time 1 of FIG. 3, Bj of a predetermined size is secured to make the transmission thereof possible, whereas if Bj is updated based on the longer TTI (Line 2), Bj is 0 to make the transmission thereof impossible.

If Bj is updated based on the longer TTI, the Bj value becomes small as compared with the Bj value obtained in case where the Bj value is updated based on the shorter TTI. Referring to scheduling time 2 of FIG. 3, if Bj is updated based on the longer TTI, the traffic size that can be sent through the LCP operation may be reduced as compared with the traffic size obtained in case where Bj is updated based on the shorter TTI.

Figure 4:
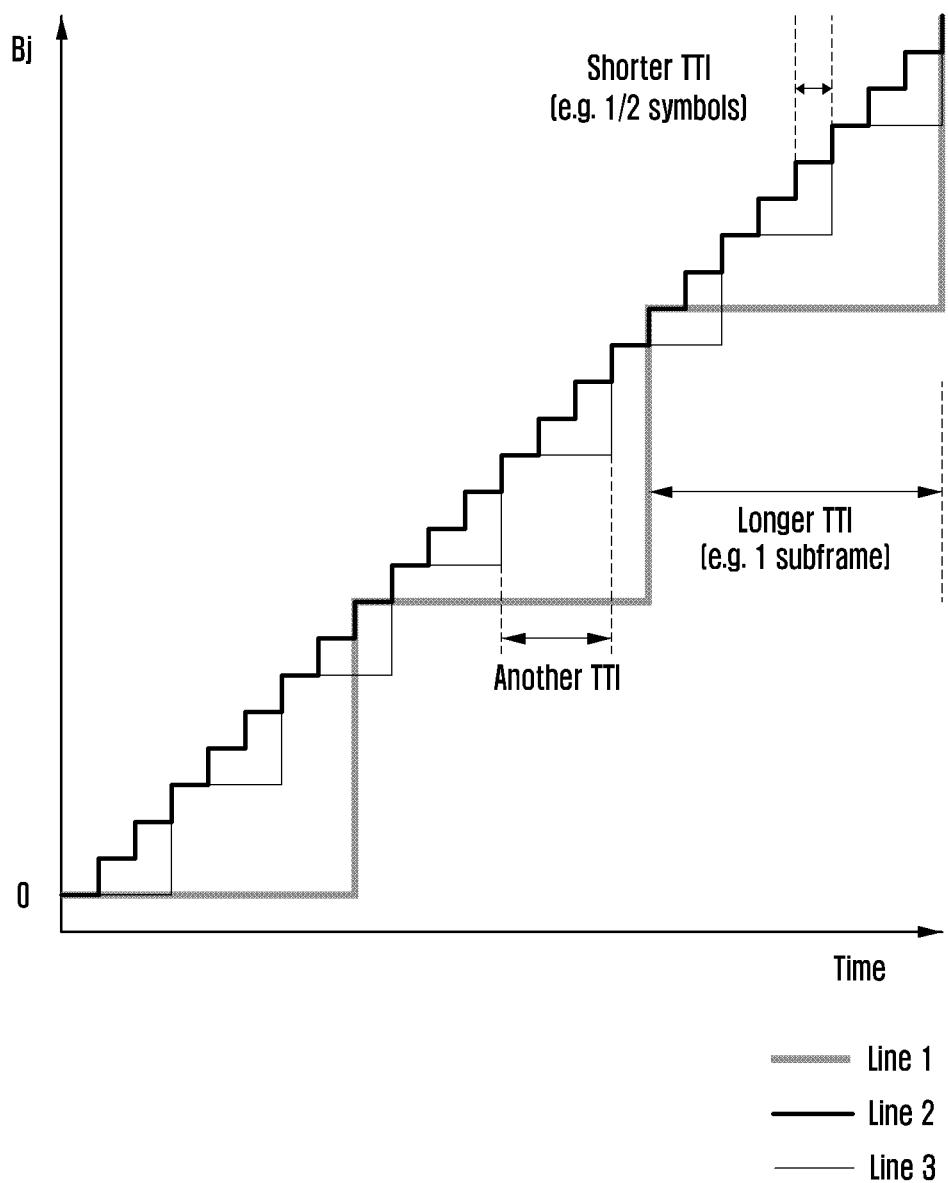
FIG. 4 is a diagram illustrating a change of Bj in accordance with time when specific LCH j can be transmitted through 3 TTIs having different lengths.

FIG. 4 illustrates a change of Bj according to time in case where it is possible to transmit traffic corresponding to a specific logical channel LCH j through 3 TTIs having different lengths.

In an example of FIG. 4, traffic corresponding to LCH j may be transmitted based on a longer TTI (e.g., 1 subframe), a shorter TTI (e.g., 1/2 symbol), or other different duration of TTI (referred to "another TTI" in FIG. 4). Line 1 means Bj that is updated based on the longer TTI, Line 2 means Bj that is updated based on the shorter TTI, and Line 3 means Bj that is updated based on another TTI.

As expressed in FIG. 4, if traffic on one LCH is transmitted based on various numerology types or TTI durations, the terminal should determine based on what type of TTI the terminal is to update Bj for LCH j. In the present disclosure, detailed methods in which based on what type of TTI a terminal updates Bj for LCH j will be described.

Embodiment 1

According to embodiment 1, if traffic on LCH j can be transmitted based on several TTI types, a terminal updates Bj for respective TTI types in all, and if a UL grant is received, the terminal performs an LCP operation by selecting Bj to match the TTI type of an allocated UL resource. More specifically, embodiment 1 will be described through a flowchart of FIG. 5.

Figure 5:
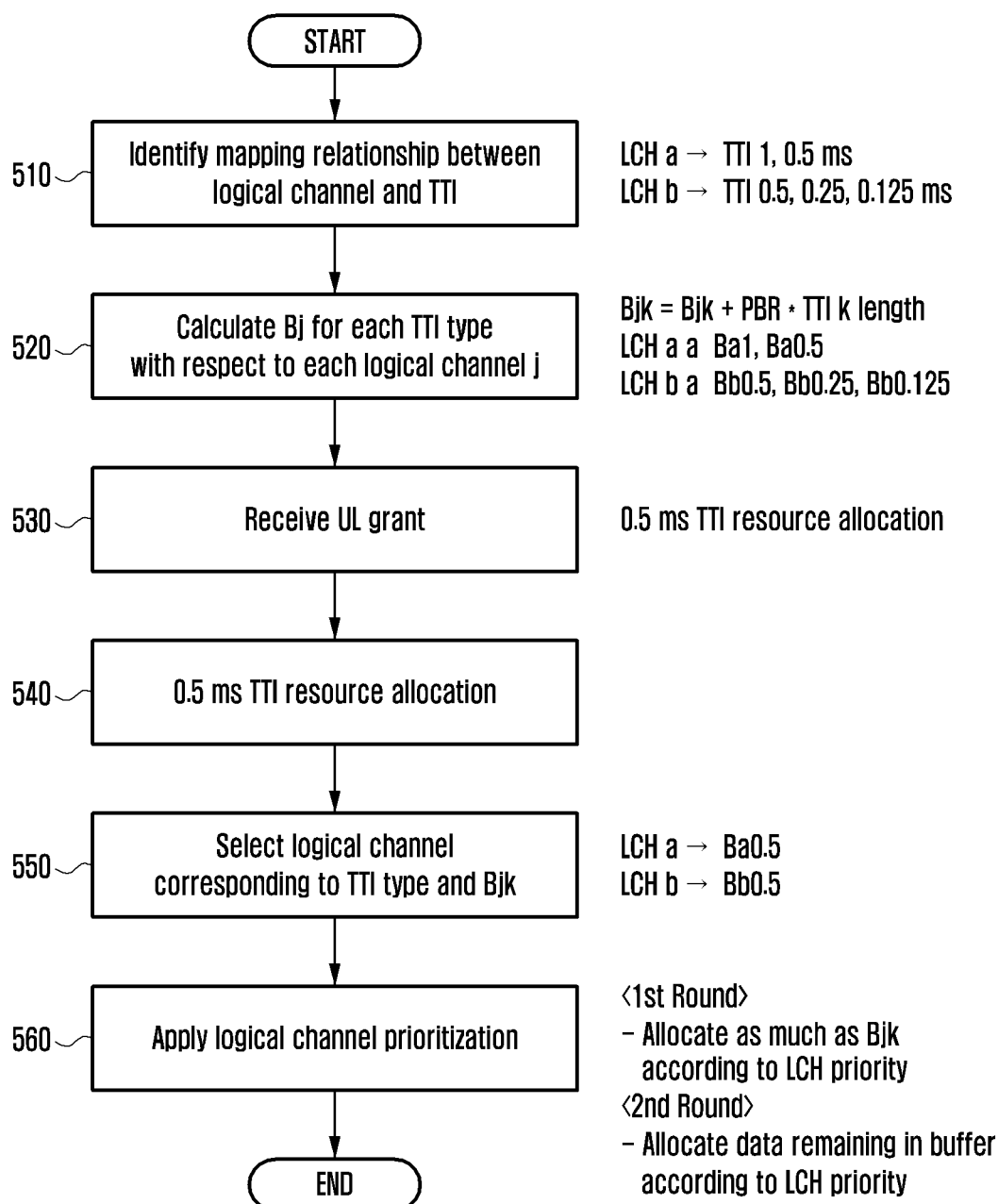
FIG. 5 is a diagram illustrating a method for calculating Bj with respect to all TTI types supporting LCH j and selecting one of calculated Bj in accordance with a UL grant as proposed scheme 1.

FIG. 5 is a diagram illustrating embodiment 1 in which Bj is calculated with respect to all TTI types supported by LCH j and one of calculated Bj is selected in accordance with a UL grant.

Since LPC is a terminal operation for UL transmission, embodiment 1 will be described around the operation of the terminal. This is described below.

Operation 510. A base station provides logical channel configuration information to the terminal through RRC layer signaling or the like. The terminal having received this identifies the corresponding relationship between the LCH and the TTI type.

A. In the present disclosure, a case where LCH a and LCH b are configured to the terminal is considered. Further, it is considered that traffic associated with LCH a can be transmitted through a UL resource having the TTI duration of 1 ms or 0.5 ms, and traffic associated with LCH b can be transmitted through a UL resource having the TTI duration of 0.5 ms, 0.25 ms, or 0.125 ms.

B. Further, it is assumed that LCH a has a higher priority than the priority of LCH b.

Operation 520. The terminal calculates Bj with respect to all TTI types that can be transmitted through each LCH j with respect to all LCHs. If it is assumed that Bjk is a bucket updated based on the TTI type, e.g., the TTI duration k with respect to LCH j, Bjk is increased by PBR×(TTI duration k) for each TTI duration k.

A. In this example, with respect to LCH a, the terminal updates Ba1 that is a bucket based on the TTI type having a duration of 1 ms every 1 ms, and updates Ba0.5 that is a bucket based on the TTI type having a duration of 0.5 ms every 0.5 ms.

B. Further, with respect to LCH b, the terminal updates Bb0.5 that is a bucket based on the TTI type having a duration of 0.5 ms every 0.5 ms, updates Bb0.25 that is a bucket based on the TTI type having a duration of 0.25 ms every 0.25 ms, and updates Bb0.125 that is a bucket based on the TTI type having a duration of 0.125 ms every 0.125 ms.

Operations 530 and 540. If a UL grant is received from the base station in a state where the terminal updates {Ba1, Ba0.5} with respect to LCH a, and updates {Bb0.5, Bb0.25, Bb0.125} with respect to LCH b, the terminal identifies allocated numerology and TTI type from the UL grant.

A. In this example, it is assumed that the base station allocates a UL resource having 0.5 ms TTI to the terminal.

Operation 550. The terminal having identified the TTI type allocated by the base station through the UL grant selects a bucket corresponding to the corresponding TTI type with respect to all LCHs that can be used for transmission through the corresponding TTI type.

A. In this example, the terminal selects Ba0.5 that is a bucket corresponding to 0.5 ms TTI with respect to LCH a, and selects Bb0.5 that is a bucket corresponding to 0.5 ms TTI even with respect to LCH b.

Operation 560. The terminal performs an LCP operation based on the priority between the given LCHs and the bucket selected with respect to each LCH.

A. As described above, in this example, it is assumed that LCH a has a higher priority than the priority of LCH b. Accordingly, the terminal previously allocates the traffic belonging to LCH a to the transport block allocated through the UL grant as much as Ba0.5.

B. Next, the terminal allocates the traffic belonging to LCH b to the transport block as much as Bb0.5.

C. Next, the terminal allocates traffic that has not yet been allocated among traffic belonging to LCH a to the given transport block.

D. If any resources remain, the terminal allocates traffic that has not yet been allocated among traffic belonging to LCH b to the given transport block.

The concept of embodiment 1 as described above is illustrated in FIG. 6.

Figure 6:
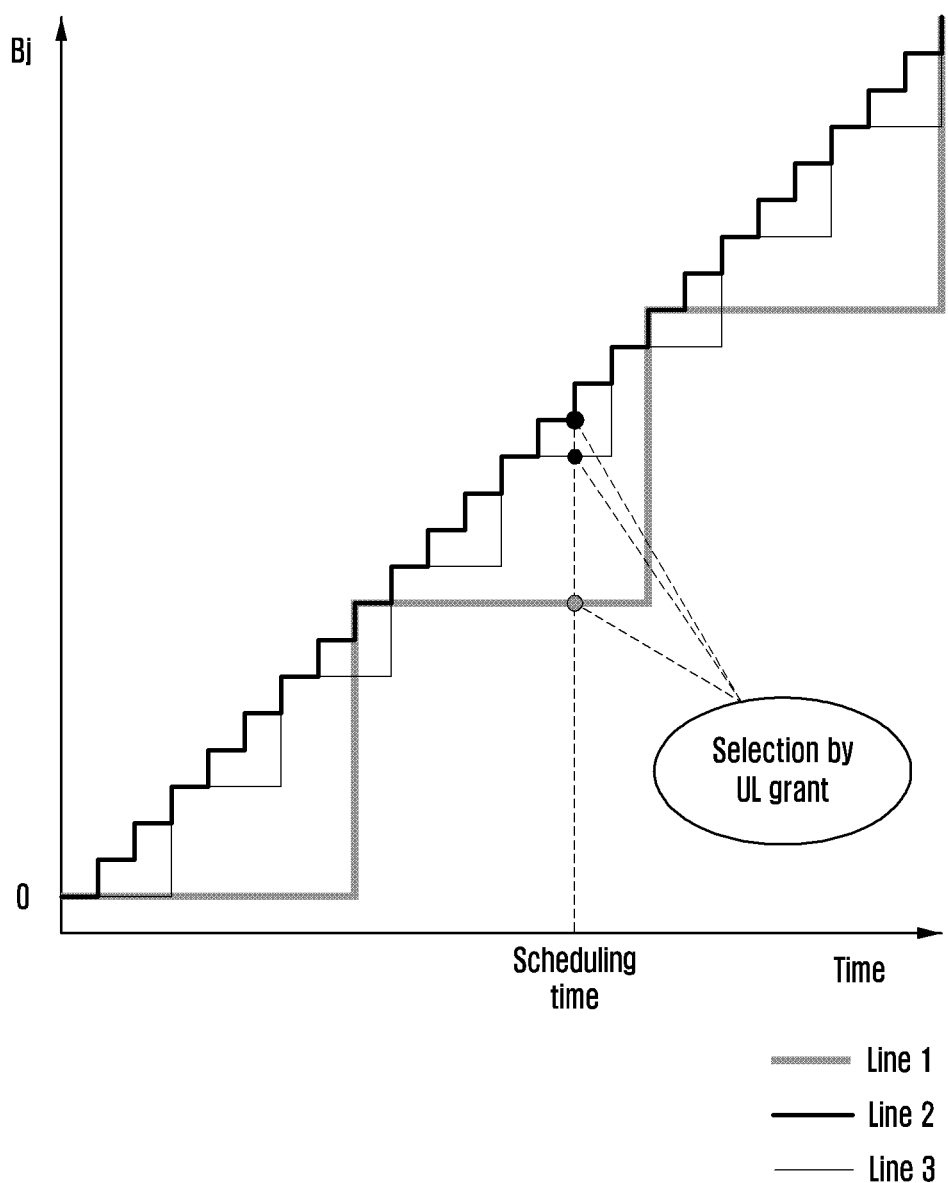
FIG. 6 is a diagram illustrating an example of selecting Bj corresponding to a TTI type of an allocated UL resource when a terminal updates the Bj based on all TTI types and receives a UL grant in case where specific LCH j can be transmitted through a plurality of TTI types as in proposed scheme 1.

FIG. 6 is a diagram illustrating an example in which the terminal selects Bj corresponding to a TTI type (e.g., Line 1) of an allocated UL resource by updating Bj with respect to all types of TTIs (Lines 1 to 3) and receiving a UL grant when traffic for a specific logical channel LCH j can be transmitted based on various TTI types.

Embodiment 2

According to embodiment 2, if traffic on LCH j can be transmitted based on several TTI types, a base station or a terminal selects one reference TTI type among the several TTI types, and the terminal performs an LCP operation after updating Bj based on the selected TTI type. More specifically, embodiment 2 will be described through a flowchart of FIG. 7.

Figure 7:
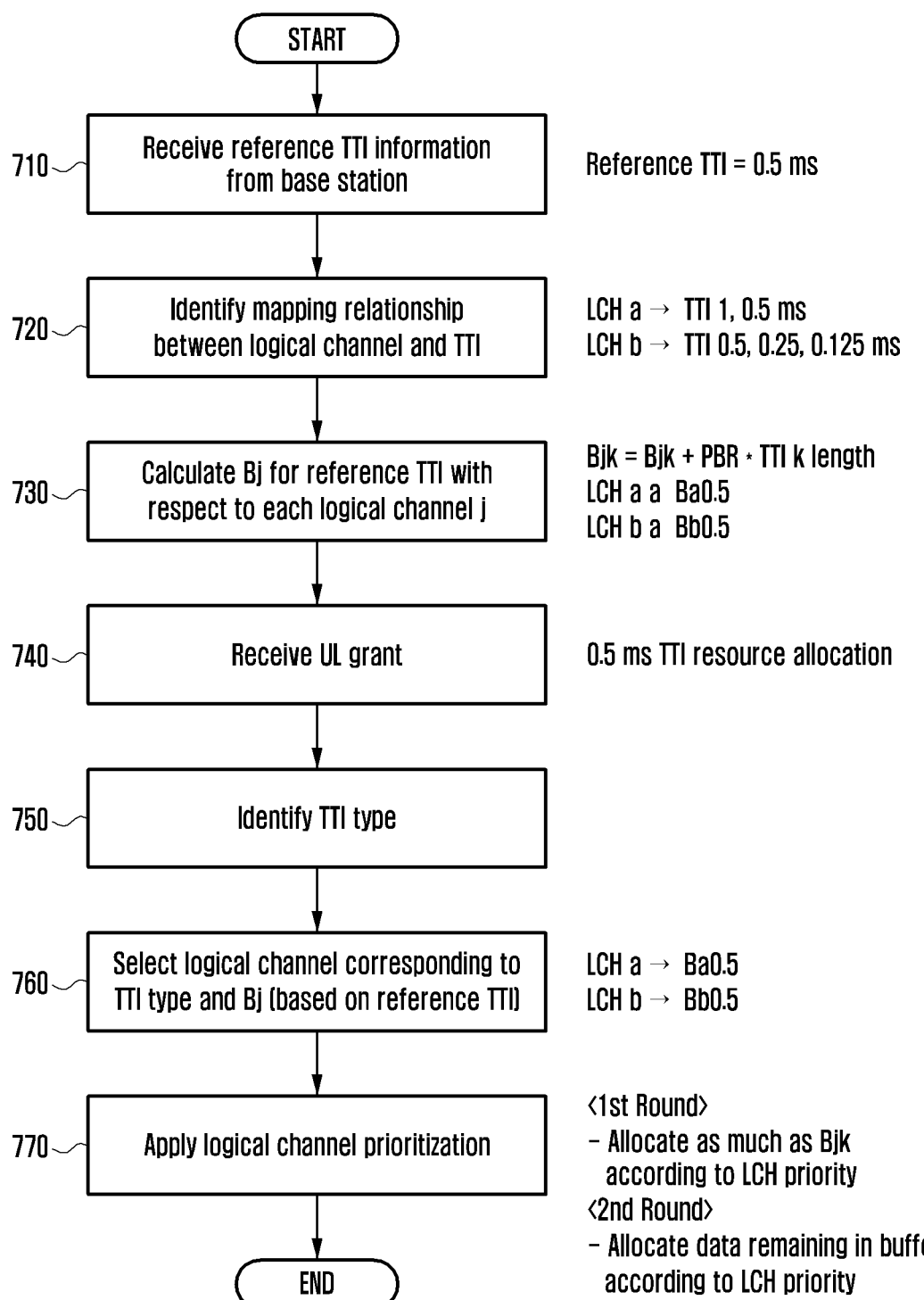
FIG. 7 is a diagram illustrating a method for updating Bj with respect to a reference TTI that is determined as a reference rather than updating the Bj with respect to all TTIs even if it is possible to transmit a specific LCH through a plurality of TTIs.

FIG. 7 is a diagram illustrating embodiment 2 in which a reference TTI is determined without updating Bj with respect to all TTI types, and Bj for the reference TTI is updated even if it is possible to transmit traffic corresponding to a specific LCH based on the several TTIs. Explanation of embodiment 2 is as follows.

Operations 710 and 720. The base station provides logical channel configuration information to the terminal through RRC layer signaling. The terminal having received this identifies information on the TTI providing a reference in calculating a bucket and a corresponding relationship between the LCH and the TTI type.

A. In this example, a case in which the base station configures a reference TTI of 0.5 ms to the terminal is considered. The reference TTI may be a value configured for each logical channel, a value configured for each terminal, or a value configured for each cell.

B. Further, a case where LCH a and LCH b are configured to the terminal is considered. A case where traffic associated with LCH a can be transmitted through a UL resource having the TTI having a length of 1 ms or 0.5 ms, and traffic associated with LCH b can be transmitted through a UL resource having the TTI having a length of 0.5 ms, 0.25 ms, or 0.125 ms is considered.

C. Further, it is assumed that LCH a has a higher priority than the priority of LCH b.

Operation 730. The terminal calculates Bj for a reference TTI type with respect to all LCHs. If it is assumed that Bjk is a bucket updated based on the TTI type, e.g. the TTI duration k with respect to LCH j, Bjk is increased by PBR×(TTI duration k) for each TTI duration k.

A. In this example, since the length of the reference TTI configured by the base station to the terminal is 0.5 ms, the terminal updates Ba0.5 associated with LCH a and Bb0.5 associated with LCH b, that are buckets based on the TTI type having a duration of 0.5 ms, every 0.5 ms, respectively.

Operations 740 and 750. If a UL grant is received from the base station in a state where the terminal updates {Ba0.5} associated with LCH a and {Bb0.5} associated with LCH b respectively, the terminal identifies allocated numerology and TTI type from the UL grant.

A. In this example, a case where the base station allocates a UL resource having 0.5 ms TTI to the terminal is considered.

Operation 760. The terminal having identified the allocated TTI type from the UL grant from the base station identifies LCHs corresponding to the corresponding TTI type and a bucket based on the reference TTI type with respect to the corresponding LCHs.

Operation 770. The terminal performs an LCP operation using the bucket calculated based on the priority between the given LCHs and the reference TTI with respect to each LCH.

A. As described above, in this example, it is assumed that LCH a has a higher priority than the priority of LCH b. Accordingly, the terminal previously allocates the traffic belonging to LCH a to the transport block allocated through the UL grant as much as Ba0.5.

B. Next, the terminal allocates the traffic belonging to LCH b to the transport block as much as Bb0.5.

C. Next, the terminal allocates traffic that has not yet been allocated among traffic belonging to LCH a to the given transport block.

D. If any resources remain, the terminal allocates traffic that has not yet been allocated among traffic belonging to LCH b to the given transport block.

If the method according to embodiment 2 is used, the terminal performs the LCP operation by applying the bucket calculated based on the reference TTI even if the base station allocates a UL resource of the TTI type that is different from the reference TTI to the terminal.

The concept of embodiment 2 as described above is illustrated in FIG. 8.

Figure 8:
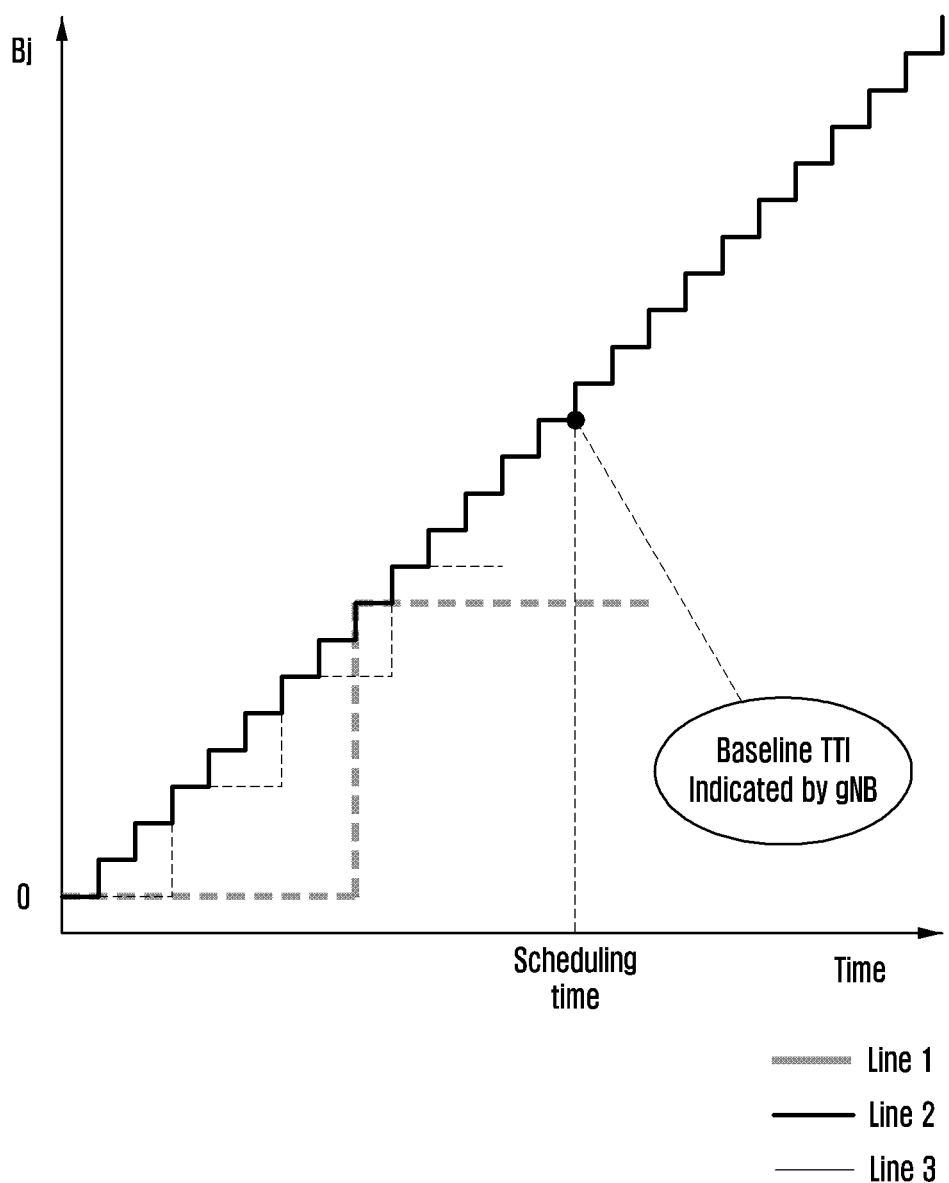
FIG. 8 illustrates a conceptual diagram of proposed scheme 2 explaining an operation in which Bj is continuously updated with respect to a reference TTI, whereas the Bj is not updated with respect to other TTIs excluding the reference TTI.

FIG. 8 is a diagram illustrating an example in which the terminal first determines the reference TTI type without updating Bj with respect to all TTI types, updates Bj with respect to the reference TTI type, and then performs the LCP operation when traffic for a specific logical channel LCH j can be transmitted based on various TTI types. That is, the terminal does not update Bj with respect to other TTIs excluding the reference TTI type. In FIG. 8, line 1 corresponds to Bj for the shortest TTI type, and lines 2 and 3 correspond to Bj for other TTI types. In an example of FIG. 8, since the reference TTI is configured as the shortest TTI, the terminal continuously updates Bj for LCH j based on the shortest TTI (line 1), but does not calculate Bj with respect to other TTI types (lines 2 and 3). As exemplified in FIG. 8, the reference TTI as described in embodiment 2 may be the shortest value among TTI types that the base station provides to all terminals in a cell. Alternatively, the reference TTI may be a baseline TTI indicated by gNB.

Embodiment 3

According to embodiment 3, if traffic on LCH j can be transmitted based on several TTI types, a terminal selects the shortest TTI type among TTI types at which the traffic for LCH j can be transmitted, updates Bj based on the corresponding TTI type, and performs an LCP operation. More specifically, embodiment 3 will be described through a flowchart of FIG. 9.

Figure 9:
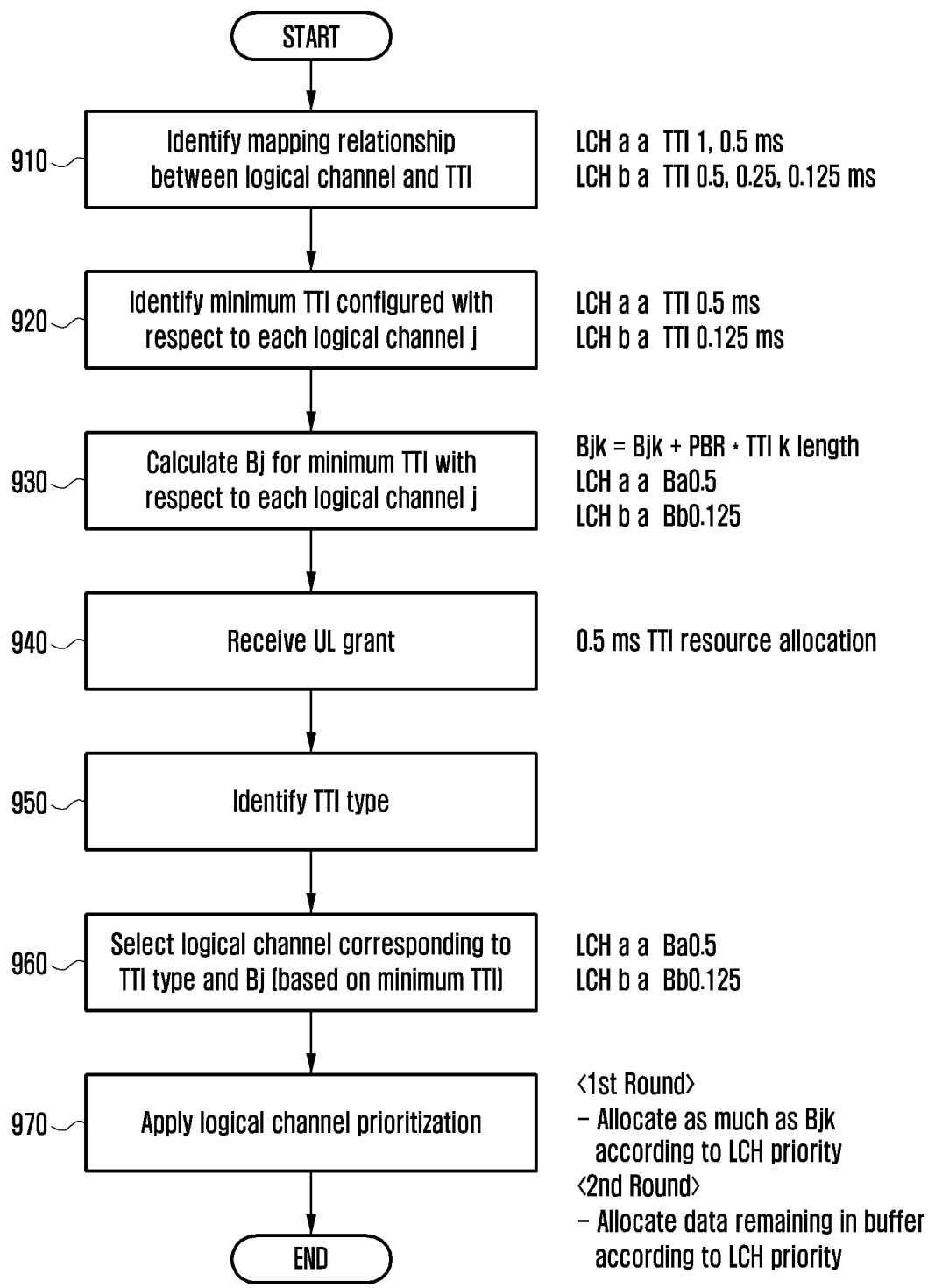
FIG. 9 illustrates a diagram of proposed scheme 3 explaining a method in which the smallest one of TTI types at which an LCH can be transmitted is selected, and then an LCP operation is performed by updating Bj based on the corresponding TTI type.

FIG. 9 is a diagram of embodiment 3 in which the smallest one of TTI types at which traffic on a specific LCH can be transmitted is selected, and then an LCP operation is performed by updating Bj based on the corresponding TTI type. Explanation of embodiment 3 is as follows.

Operation 910. A base station provides logical channel configuration information to the terminal through RRC layer signaling or the like. The terminal having received this identifies the corresponding relationship between the LCH and the TTI type.

A. In this embodiment, a case where LCH a and LCH b are configured to the terminal is considered. Further, it is considered that LCH a can be transmitted through a UL resource having the TTI duration of 1 ms or 0.5 ms, and LCH b can be transmitted through a UL resource having the TTI duration of 0.5 ms, 0.25 ms, or 0.125 ms.

B. Further, it is assumed that LCH a has a higher priority than the priority of LCH b.

Operation 920. The terminal selects the shortest TTI among TTI types at which traffic for the corresponding LCH can be transmitted with respect to respective LCHs.

A. In this example, the TTI having a duration of 0.5 ms is selected with respect to LCH a, and the TTI having a duration of 0.125 ms is selected with respect to LCH b.

Operation 930. The terminal calculates Bj for the shortest TTI type selected at operation 930 with respect to all LCHs. If it is assumed that Bjk is a bucket updated based on the TTI type, e.g., the TTI duration k with respect to LCH j, Bjk is increased by PBR×(TTI duration k) for each TTI duration k.

A. In this example, since the shortest TTI at which traffic for LCH a can be transmitted is 0.5 ms, and the shortest TTI at which traffic for LCH b can be transmitted is 0.125, the terminal updates Ba0.5 for LCH a every 0.5 ms, and updates Ba0.125 for LCH b every 0.125 ms.

Operations 940 and 950. If a UL grant is received from the base station in a state where the terminal updates {Ba0.5} and {Bb0.125} with respect to LCH a and LCH b, respectively, the terminal identifies allocated numerology and TTI information from the UL grant.

A. In this example, a case where the base station allocates a UL resource having 0.5 ms TTI to the terminal is considered.

Operation 960. The terminal having identified the allocated TTI type from the UL grant from the base station identifies LCHs corresponding to the corresponding TTI type and a bucket based on the shortest TTI type with respect to the corresponding LCHs.

Operation 970. The terminal performs an LCP operation using the bucket calculated based on the priority between the given LCHs and the shortest TTI with respect to each LCH.

A. As described above, in this example, it is assumed that LCH a has a higher priority than the priority of LCH b. Accordingly, the terminal previously allocates the traffic belonging to LCH a to the transport block allocated through the UL grant as much as Ba0.5.

B. Next, the terminal allocates the traffic belonging to LCH b to the transport block as much as Bb0.125.

C. Next, the terminal allocates traffic that has not yet been allocated among traffic belonging to LCH a to the given transport block.

D. If any resources remain, the terminal allocates traffic that has not yet been allocated among traffic belonging to LCH b to the given transport block.

If the method according to embodiment 3 is used, the terminal performs the LCP operation by applying the bucket calculated based on the shortest TTI at which traffic for respective LCHs can be transmitted regardless of what TTI type the base station has allocated to the terminal.

The concept of embodiment 3 as described above is illustrated in FIG. 10.

Figure 10:
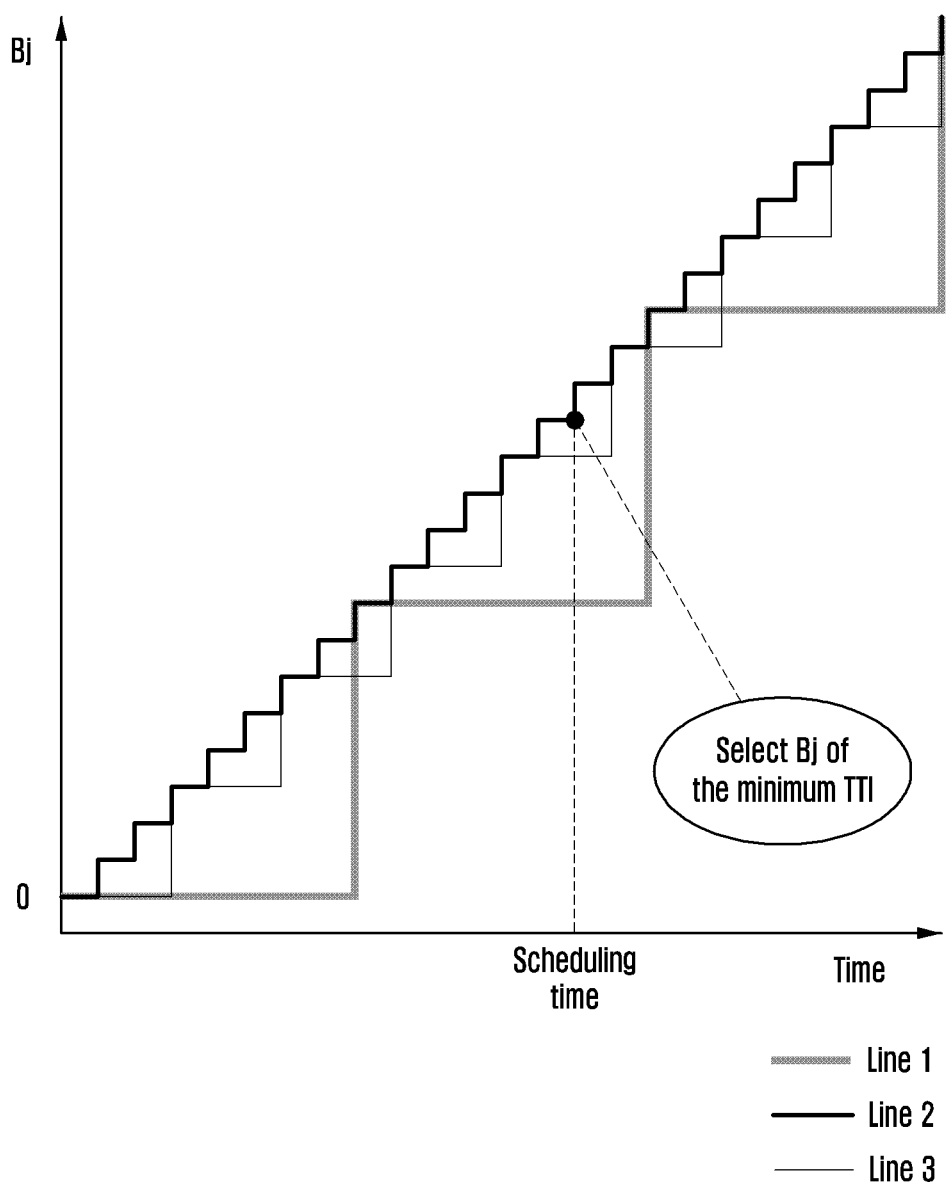
FIG. 10 is a diagram illustrating a method for updating Bj to match the shortest one of TTI types at which an LCH can be transmitted.

FIG. 10 is a diagram illustrating an example in which the terminal first determines the shortest TTI type at which traffic for respective LCHs can be transmitted without updating Bj with respect to all TTI types, updates Bj with respect to the corresponding TTI type, and then performs the LCP operation when traffic for a specific logical channel LCH j can be transmitted based on various TTI types.

In embodiment 3, the shortest TTI selected by the terminal may be the shortest TTI among the TTI types supporting the respective LCHs. With respect to different LCHs, for example, the bucket value may be updated based on the respective different shortest TTIs as follows.

TTI type {1, 0.5} ms supporting LCH a: Bucket update based on 0.5 ms TTI

TTI type {0.5, 0.25, 0.125} ms supporting LCH b: Bucket update based on 0.125 ms TTI As an alternative, the shortest TTI selected by the terminal in embodiment 3 may be the shortest TTI among all LCHs configured to the terminal and all TTI types supporting them. Even in case of different LCHs, the bucket value can be updated based on the common shortest TTI.

TTI type {1, 0.5} ms supporting LCH a

TTI type {0.5, 0.25, 0.125} ms supporting LCH b

Bucket update based on 0.125 ms TTI for both LCH a and LCH b

According to the scheme proposed in the present disclosure, the bucket adaptation of respective LCHs may be specified in the standards as follows. The method for adopting LCH bucket based on the reference TTI configured by the base station is exemplified as follows.

The MAC entity shall maintain a variable Bj for each logical channel j. Bj shall be initialized to zero when the related logical channel is established, and incremented by the product PBR×TTI$_{reference}$ duration for each TTI$_{reference}$, where PBR is prioritized bit rate of logical channel j and TTI$_{reference}$ is the reference TTI configured by gNB to manage Bj. However, the value of Bj cannot exceed the bucket size and if the value of Bj is larger than the bucket size of logical channel j, it shall be set to the bucket size. The bucket size of a logical channel is equal to PBR×BSD, where PBR and BSD are configured by upper layers.

As another example, a method for bucket update based on the shortest TTI among TTIs that can be used for a specific channel is specified as follows.

The MAC entity shall maintain a variable Bj for each logical channel j. Bj shall be initialized to zero when the related logical channel is established, and incremented by the product PBR×TTI$_{minimum}$ duration for each TTI$_{minimum}$, where PBR is prioritized bit rate of logical channel j and TTI$_{minimum}$ is the minimum or shortest TTI among the TTIs that are configured to logical channel j. However, the value of Bj cannot exceed the bucket size and if the value of Bj is larger than the bucket size of logical channel j, it shall be set to the bucket size. The bucket size of a logical channel is equal to PBR×BSD, where PBR and BSD are configured by upper layers.]

As another example, a method for bucket update based on the shortest TTI among TTIs that can be used by the terminal is specified as follows.

The MAC entity shall maintain a variable Bj for each logical channel j. Bj shall be initialized to zero when the related logical channel is established, and incremented by the product PBR×TTI$_{minimum}$ duration for each TTI$_{minimum}$, where PBR is prioritized bit rate of logical channel j and TTI$_{minimum}$ is the minimum of shortest TTI among the TTIs that are configured to the UE. However, the value of Bj cannot exceed the bucket size and if the value of Bj is larger than the bucket size of logical channel j, it shall be set to the bucket size. The bucket size of a logical channel is equal to PBR×BSD, where PBR and BSD are configured by upper layers.

The above-described example means that 0.125 ms that is the shortest value among all TTIs configured to the terminal is configured as TTI$_{minimum}$ in case where the terminal is configured to use LCH a and LCH b, LCH a is configured to use TTI 1 ms and 0.5 ms and LCH b is configured to use TTI 0.25 ms and 0.125 ms.

As another example, a method for bucket update based on the shortest TTI among TTIs used in a cell is specified as follows.

The MAC entity shall maintain a variable Bj for each logical channel j. Bj shall be initialized to zero when the related logical channel is established, and incremented by the product PBR×TTI$_{minimum}$ duration for each TTI$_{minimum}$, where PBR is prioritized bit rate of logical channel j and TTI$_{minimum}$ is the minimum of shortest TTI among the TTIs that are supported by the serving cell of the UE. However, the value of Bj cannot exceed the bucket size and if the value of Bj is larger than the bucket size of logical channel j, it shall be set to the bucket size. The bucket size of a logical channel is equal to PBR×BSD, where PBR and BSD are configured by upper layers.

As another example, a method for bucket update based on the TTI determined by implementation through the terminal is specified as follows.

The MAC entity shall maintain a variable Bj for each logical channel j. Bj shall be initialized to zero when the related logical channel is established, and incremented by the product PBR×TTI$_{UEimplemented}$ duration for each TTI$_{UEimplemented}$, where PBR is prioritized bit rate of logical channel j and TTI$_{UEimplemented}$ is the TTI that is selected by the UE (that is, TTI$_{UEimplemented}$ depends on the UE implementation). However, the value of Bj cannot exceed the bucket size and if the value of Bj is larger than the bucket size of logical channel j, it shall be set to the bucket size. The bucket size of a logical channel is equal to PBR×BSD, where PBR and BSD are configured by upper layers.

As another example, a method for updating a bucket with respect to all TTI types configured on a specific logical channel and determining the bucket in accordance with the TTI type included in a UL grant when the terminal receives the corresponding UL grant is specified as follows.

The MAC entity shall maintain a variable Bj,k for each logical channel j and for each TTI k configured to logical channel j. Bj,k shall be initialized to zero when the related logical channel is established, and incremented by the product PBR×TTI$_k$ duration for each TTI$_k$ for all k, where PBR is prioritized bit rate of logical channel j and TTI$_k$ is the TTI configured to logical channel j. However, the value of Bj,k cannot exceed the bucket size and if the value of Bj,k is larger than the bucket size of logical channel j, it shall be set to the bucket size. The bucket size of a logical channel is equal to PBR×BSD, where PBR and BSD are configured by upper layers.

The MAC entity shall perform the following Logical Channel Prioritization procedure when a new transmission is performed:

The MAC entity shall allocate resources to the logical channels in the following steps:

Step 1: The UE identifies the TTI k* in the UL grant assigned by eNB. Then, Bj is set to Bj,k* for all j. All the logical channels with Bj>0 are allocated resources in a decreasing priority order. If the PBR of a logical channel is set to "infinity", the MAC entity shall allocate resources for all the data that is available for transmission on the logical channel before meeting the PBR of the lower priority logical channel(s);

Step 2: the MAC entity shall decrement Bj by the total size of MAC SDUs served to logical channel j in Step 1;

NOTE: The value of Bj can be negative.

Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.

As described above, how Bj that is a bucket of LCH j should be calculated when one LCH can be transmitted based on several TTI types has been described. Hereinafter, an operation of selecting an LCH that is the object of the LCP operation when respective LCHs can be transmitted through various numerologies or TTI types will be proposed.

According to TS 36.321 document defining MAC layer operations in an LTE system, the LCH that is the object of the LCP operation is determined by the following methods.

Step 1: All the logical channels with Bj>0 are allocated resources in a decreasing priority order. If the PBR of a logical channel is set to "infinity", the MAC entity shall allocate resources for all the data that is available for transmission on the logical channel before meeting the PBR of the lower priority logical channel(s);

Step 2: the MAC entity shall decrement Bj by the total size of MAC SDUs served to logical channel j in Step 1;

Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.

As disclosed "[a]ll the logical channels with Bj>0 are allocated resources in a decreasing priority order" above, in an LTE system using a single numerology and TTI type, all LCHs with Bj>0 becomes the object of LCP. If traffic for one LCH can be transmitted through a UL resource configured with various numerologies and TTI types, the LCH that is the object of LCP should be selected in consideration of not only Bj but also the numerology and/or TTI type. A scheme for this is illustrated in FIG. 11.

Figure 11:
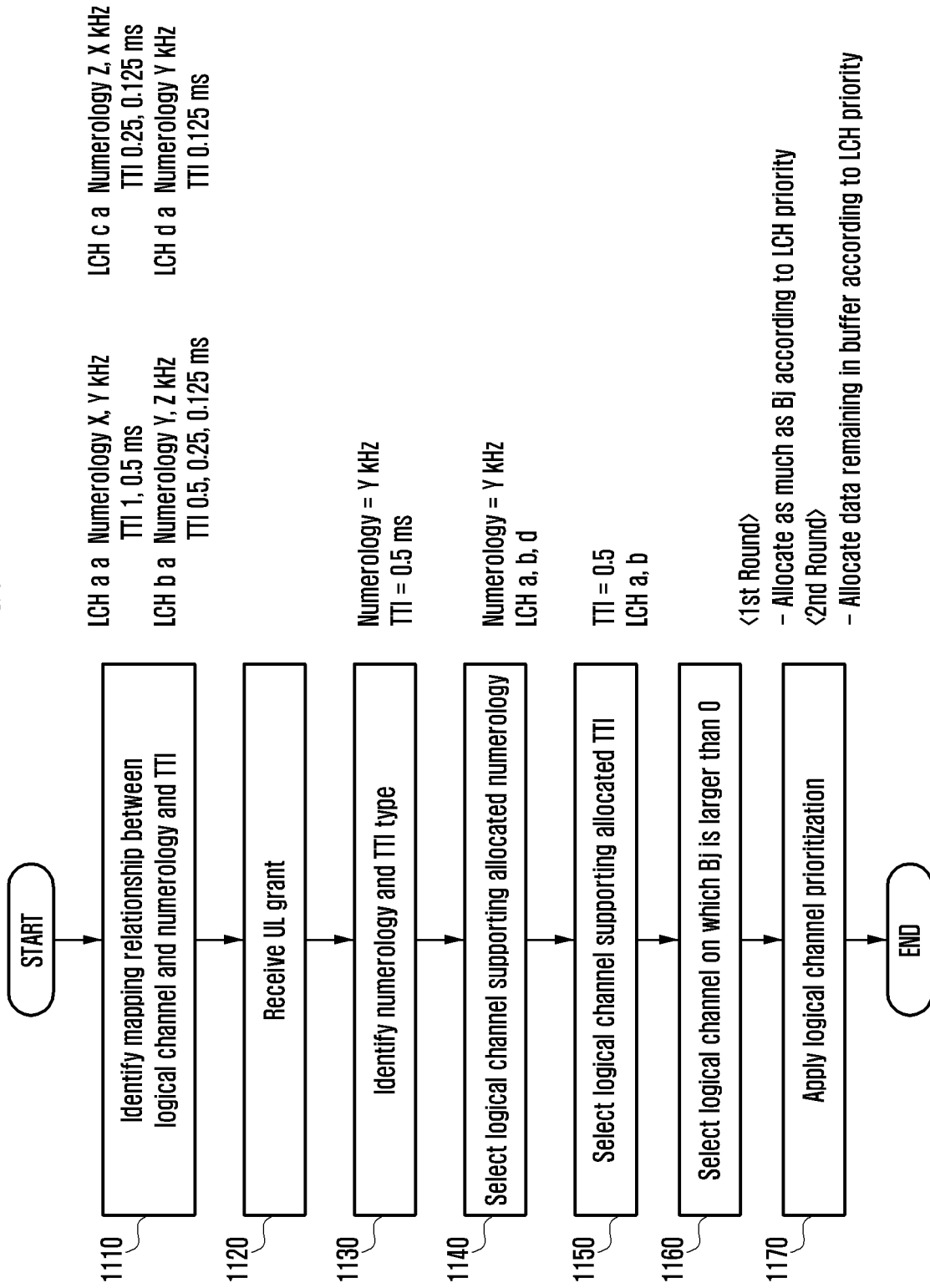
FIG. 11 is a diagram explaining an operation of selecting an LCH that is the object of an LCP in case where one LCH can be transmitted through a UL resource composed of a plurality of numerologies or TTI types.

FIG. 11 is a diagram illustrating an operation of selecting an LCH that is the object of an LCP in case where traffic for one LCH can be transmitted through a UL resource configured with a plurality of numerologies or TTI types.

The scheme illustrated in FIG. 11 operates as follows.

Operation 1110. The base station provides logical channel configuration information to the terminal. The logical channel configuration information may be received through RRC layer signaling or the like. The logical channel configuration information includes a corresponding relationship between LCH and at least one of numerology or TTI type (e.g., TTI duration). The logical channel configuration information may refer to information on mapping restrictions for each logical channel.

A. In this example, traffic for LCH a can be transmitted through a UL resource configured with numerology (e.g., subcarrier spacing) X kHz and Y kHz, and TTI durations of 1 ms and 0.5 ms.

B. Further, traffic for LCH b can be transmitted through a UL resource configured with numerology Y kHz and Z kHz, and TTI durations of 0.5 ms, 0.25 ms, and 0.125 ms.

C. Further, traffic for LCH c can be transmitted through a UL resource configured with numerology Z kHz and X kHz, and TTI durations of 0.25 ms and 0.125 ms.

D. Further, traffic for LCH d can be transmitted through a UL resource configured with numerology Y kHz and a TTI duration of 0.125 ms.

Operations 1120 and 1130. The terminal receives a UL grant from the base station, and identifies the characteristic of an allocated UL resource (e.g., numerology, TTI duration or the like).

A. In this example, a situation in which numerology of a UL resource is Y kHz and the TTI duration allocated from the base station is 0.5 ms is considered.

Operation 1140. The terminal selects a logical channel supporting numerology of a resource allocated through a UL grant received from the base station.

A. In this example, since numerology of a UL resource allocated from the base station is Y kHz, the terminal selects LCH {a, b, d}. Since LCH c does not support numerology Y kHz, the terminal does not select it.

Operation 1150. The terminal select a logical channel supporting the TTI duration of a resource allocated through a UL grant received from the base station.

A. In this example, since the TTI duration of a UL resource allocated from the base station is 0.5 ms, the terminal selects LCH {a, b} among LCH {a, b, d} previously selected at operation 1150. Since LCH d does not support the TTI duration of 0.5 ms, the terminal does not select it.

Operation 1160. The terminal selects LCH with Bj that is larger than 0 corresponding to a bucket of each LCH j among LCHs selected based on numerology and TTI duration.

Operation 1170. Thereafter, an LCP operation is performed with respect to the LCH selected based on numerology and TTI duration, and bucket.

Referring to FIG. 11, a method for selecting an LCH that becomes the object of LCP during performing of the LCP has been proposed. More specifically, a first LCH candidate is selected based on numerology of a resource allocated through a UL grant, a second LCH candidate is selected from the first LCH candidate based on the TTI duration of a resource allocated through the UL grant, and then the LCH with Bj that is larger than 0 is selected to be applied to the LCP operation.

FIGS. 12 to 16 are diagrams illustrating another embodiments of an LCH selection scheme for LCP performing;

Referring to FIGS. 12 to 16, similar to FIG. 11, a terminal identifies a corresponding relationship between LCH and at least one of numerology or TTI duration based on logical channel configuration information provided from the base station at operation 1210, 1310, 1410, 1510 or 1610. The terminal receives a UL grant from the base station at operation 1220, 1320, 1420, 1520 or 1620, and identifies the characteristic of an allocated UL resource (e.g., numerology, TTI duration or the like) at operation 1230, 1330, 1430, 1530 or 1630.

Figure 12:
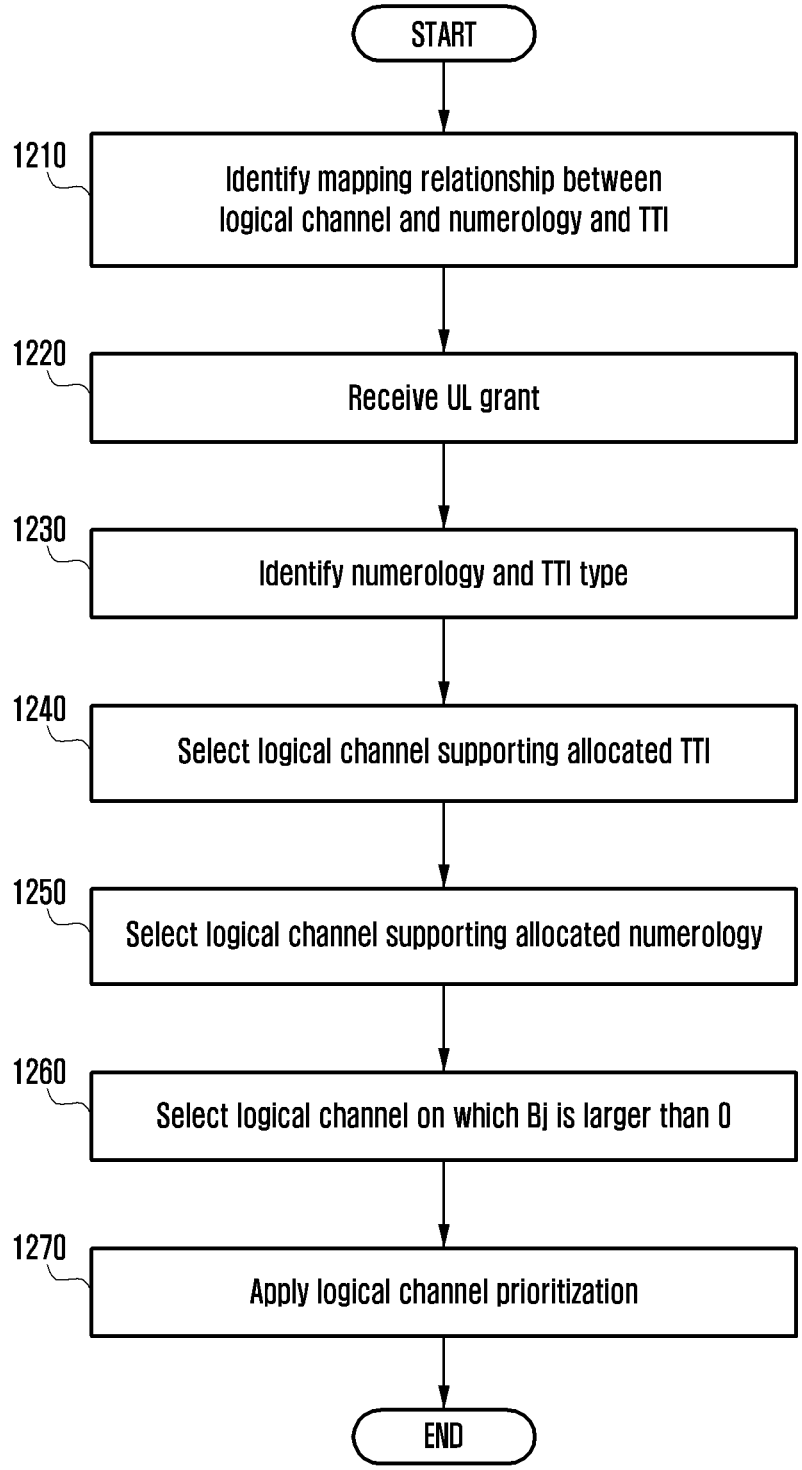
FIG. 12 is a diagram illustrating another embodiment of an LCH selection scheme for LCP performing.

However, referring to FIG. 12, an LCH corresponding to a TTI type allocated in a UL grant is first selected at operation 1240, the LCH corresponding to the numerology type allocated in the UL grant is selected at operation 1250, and then LCH j with Bj that is larger than 0 is finally selected at operation 1260 to apply a logical channel prioritization at operation 1270.

Figure 13:
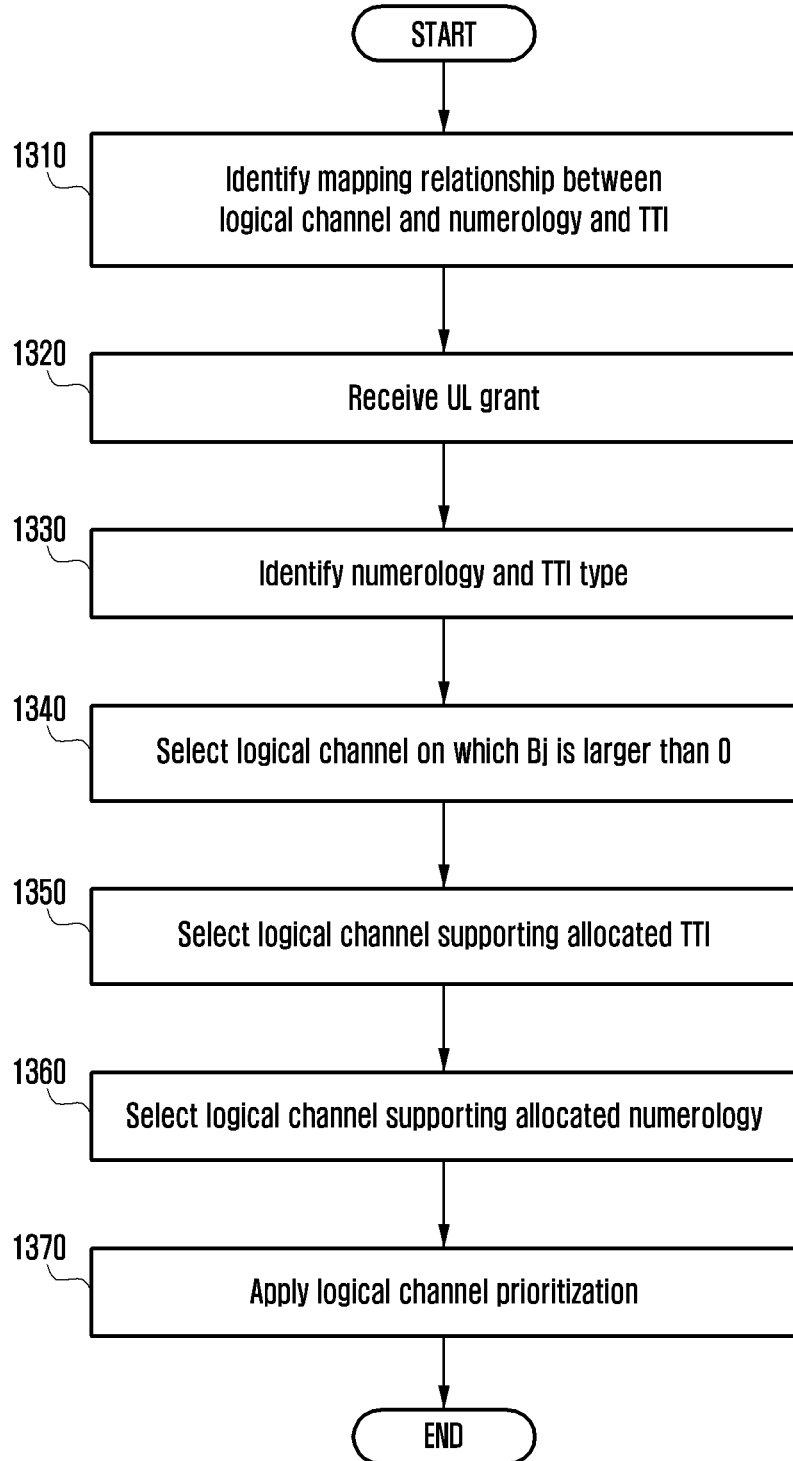
FIG. 13 is a diagram illustrating another embodiment of an LCH selection scheme for LCP performing.

Referring to FIG. 13, LCH j with Bj that is larger than 0 corresponding to a bucket is first selected at operation 1340, an LCH corresponding to a numerology type allocated in a UL grant is next selected at operation 1350, and then an LCH corresponding to the TTI type allocated in the UL grant is finally selected at operation 1360 to apply a logical channel prioritization at operation 1370.

Figure 14:
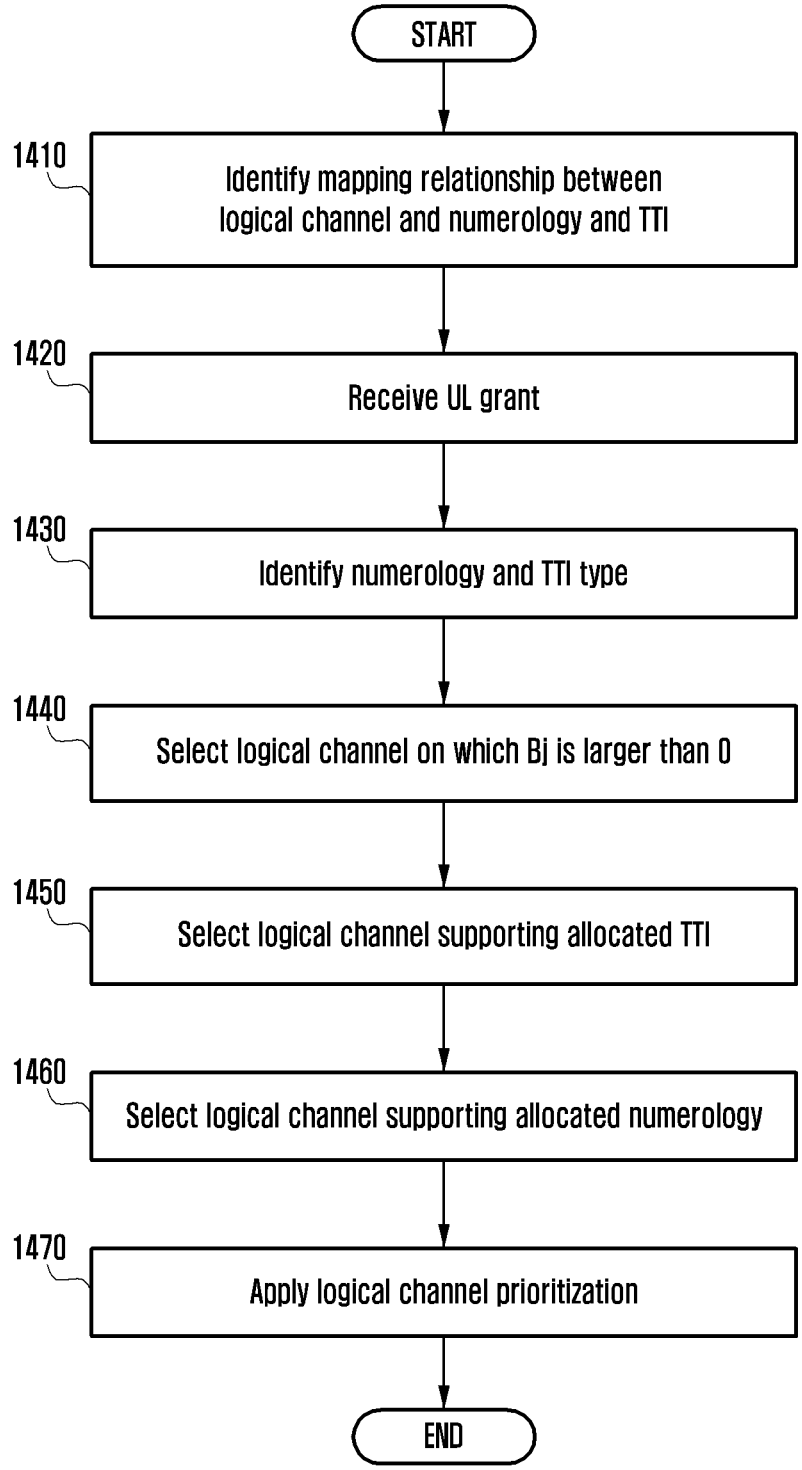
FIG. 14 is a diagram illustrating another embodiment of an LCH selection scheme for LCP performing.

Referring to FIG. 14, LCH j with Bj that is larger than 0 corresponding to a bucket is first selected at operation 1440, an LCH corresponding to a TTI type allocated in a UL grant is next selected at operation 1450, and then an LCH corresponding to the numerology type allocated in the UL grant is finally selected at operation 1460 to apply a logical channel prioritization at operation 1470.

Figure 15:
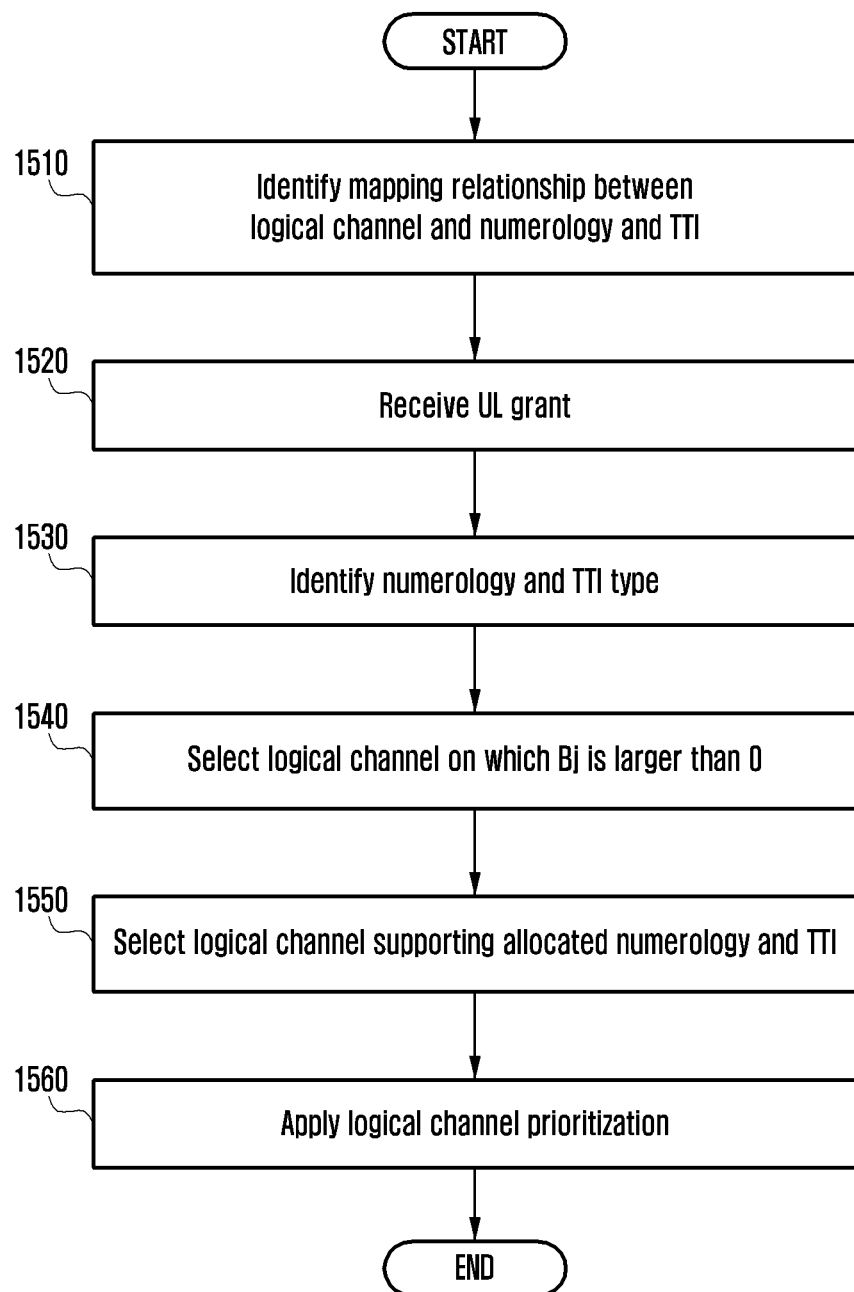
FIG. 15 is a diagram illustrating another embodiment of an LCH selection scheme for LCP performing.

Referring to FIG. 15, LCH j with Bj that is larger than 0 corresponding to a bucket is first selected at operation 1540, and then an LCH corresponding to the TTI and numerology type allocated in a UL grant is selected at operation 1550 to apply a logical channel prioritization at operation 1560.

Figure 16:
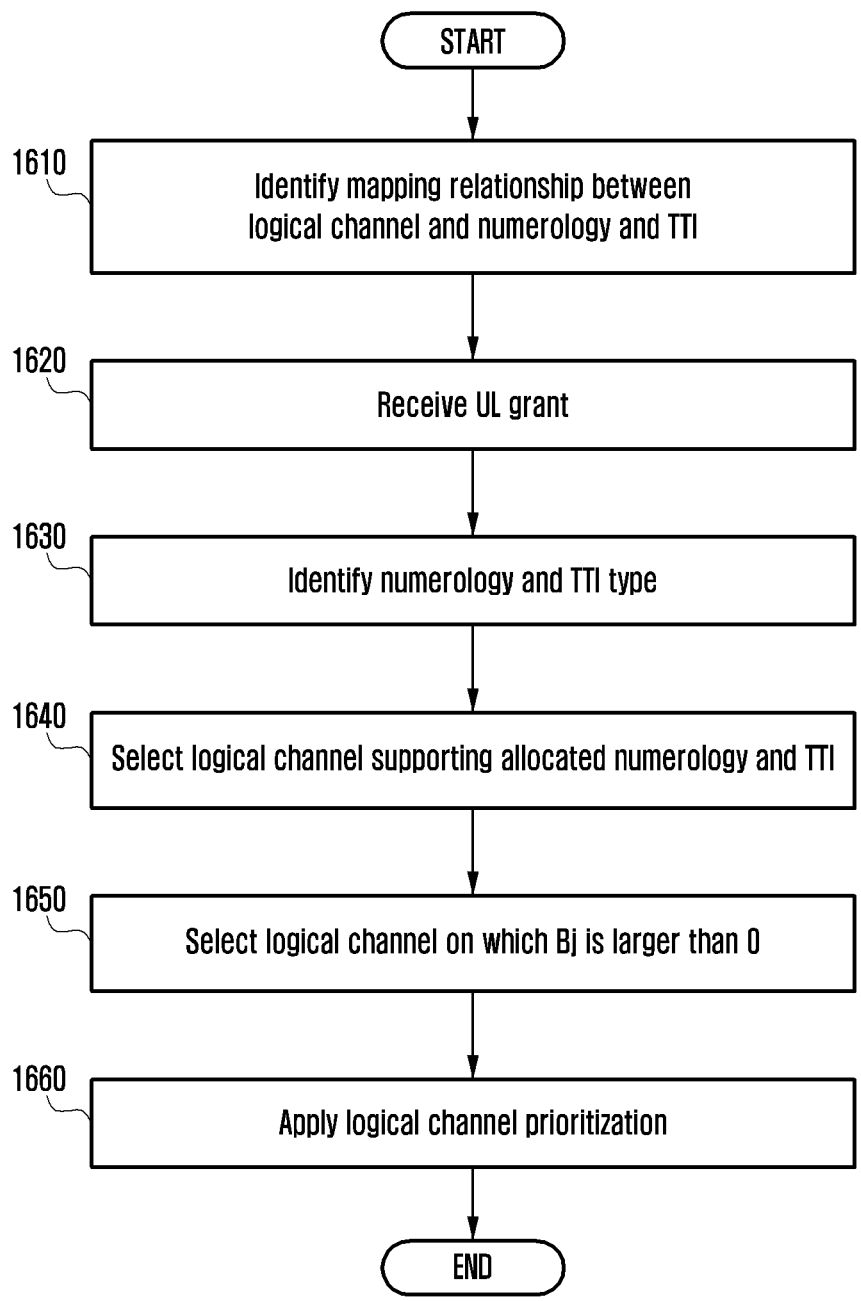
FIG. 16 is a diagram illustrating another embodiment of an LCH selection scheme for LCP performing.

Referring to FIG. 16, an LCH corresponding to the TTI and numerology type allocated in a UL grant is selected at operation 1640, and then LCH j with Bj that is larger than 0 corresponding to a bucket of the LCH is selected at operation 1650 to apply a logical channel prioritization at operation 1660.

The method for selecting an LCH that is the object of LCP operation according to the scheme proposed in the present disclosure may be specified in the standards specification as follows. The below operation corresponds to an example.

---

The MAC entity shall perform the following Logical Channel Prioritization procedure when a new transmission is performed:
  -The MAC entity shall allocate resources to the logical channels in the following steps:
    -Step 1a: The UE identifies the numerology and the TTI duration of the ULr esource allocated by the gNB.
    -Step 1b: The UE selects the logical channels that are mapped to the numerology of the UL resource.
    -Step 1c: Among the logical channels selected in Step 1b, the UE selects
      the logical channels that are mapped to the TTI duration of the UL resource.
    -Step 1d: All the logical channels with Bj >0 are allocated resources in a
      decreasing priority order. If the PBR of a logical channel is set to "infinity", the MAC entity shall allocate resources for all the data that is available for transmission on the logical channel before meeting the PBR of the lower priority logical channel(s);
    -Step 2: the MAC entity shall decrement Bj by the total size of MAC SDUs served to logical channel j in Step 1;
  NOTE: The value of Bj can be negative.
    -Step 3: if any resources remain, all the logical channels are served in a strict decreasing priority order (regardless of the value of Bj) until either
      the data for that logical channel or the UL grant is exhausted, whichever
      comes first. Logical channels configured with equal priority should be served equally.

---

The order of step 1b and step 1c as described above may be changed according to how to define the operation rule of selection of logical channels in logical channel prioritization. That is, step 1b may be performed after step 1c is first performed. Further, step 1b may be performed, and step 1c may be omitted. Alternatively, step 1c may be performed, and step 1b may be omitted.

Up to now, the UL transmission method of the terminal has been described. Problems occurring when traffic belonging to a specific logical channel is transmitted through a UL resource having specific numerology or specific TTI duration has mainly been dealt with. Last, in the present disclosure, attributes of UL resources that the base station allocates to the terminal will be described.

In the LTE, UL resources having a single numerology and single TTI duration have been used. However, in the NR, UL resources having a plurality type of numerologies and a plurality type of TTI durations may be used.

Here, an example of numerology (i.e., subcarrier spacing) may be $15*2^m$ kHz, that is, 15 kHz (m=0), 30 kHz (m=1), 60 kHz (m=2), and 120 kHz (m=3), and may be a part of values expressed in various methods, such as $15*n$ kHz, that is, 15 kHz (n=1), 30 kHz (n=2), 45 kHz (n=3), and 60 kHz (n=4).

Here, a TTI duration may refer to a subframe length, slot length, mini-slot length, a transmission period of a control channel, such as LTE PDCCH, or a configuration index thereof. For example, the TTI duration may be a part of values expressed in various methods, such as $1/2^m$ ms, that is, 1 ms (m=0), 0.5 ms (m=1), 0.25 ms (m=2), or 0.125 ms (m=3).

Figure 17:
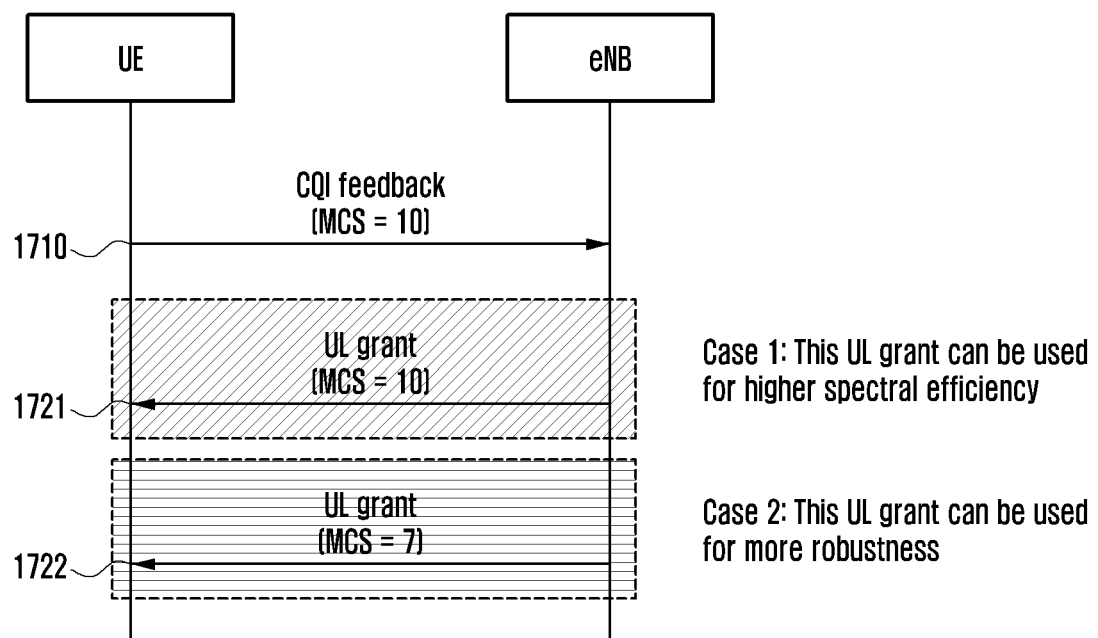
FIG. 17 is a diagram illustrating a case where an MCS expresses the character of a UL resource.

In addition to the numerology and TTI duration, various elements may be reflected in defining the character of a UL resource. As an example, there may be an MCS. FIG. 17 explains how an MCS represents the character of a UL grant.

Referring to FIG. 17:

Operation 1710. The terminal may perform channel estimation based on a reference signal transmitted by the base station, and may feedback the result of the channel estimation to the base station. For example, the terminal may feedback that the estimation of a link performance corresponds to MCS level 10.

Operation 1721 or 1722. The base station may allocate a UL resource after receiving information on the link performance of the terminal. In this case, the following two cases may be considered.

Operation 1721. The base station may allocate a UL resource corresponding to MCS level 10 that corresponds to the link performance reported by the terminal.

Operation 1722. The base station may allocate a UL resource corresponding to MCS level 7 that is lower than MCS level 10 being the link performance reported by the terminal.

If the base station allocates a UL resource corresponding to MCS level 10 at operation 1721, it may mean that the base station will transmit the largest amount of data under the currently given link performance. That is, the base station may allocate the UL resource that can maximize throughput or spectral efficiency.

In contrast, if the base station allocates a UL resource corresponding to MCS level 7 at operation 1722, it means that the base station will transmit data having a smaller size than the size of the data that can be sent under the currently given link performance but heighten reliability that can be obtained during transmission of data. This is because a lot of block error rate or packet error rate is reduced if the MCS level is lowered from 10 to 7.

As described above with reference to FIG. 17, it is determined whether a UL resource that the base station has allocated to the terminal is based a UL grant that is advantageous from the view of spectral efficiency, or based on a UL grant that is advantageous from the view of reliability or robustness, in accordance with the MCS level.

In addition to the numerology, subcarrier spacing, TTI duration, and MCS level as described above, a coding method such as low complexity parity check (LCPC), polar code, or turbo code, HARQ round trip time, and number of retransmission may exert an influence on the features of the UL resource. Accordingly, the present disclosure proposes a method for prescribing a combination of such attributes as one index and transmitting the same through a UL grant.

First, physical elements capable of prescribing the features of the UL resource are as follow.

Numerology (subcarrier spacing)
Cyclic prefix length
TTI duration
MCS level
Coding method (LDPC, polar code, turbo code)
HARQ round trip time
Bandwidth per allocated UL resource
Logical location (i.e., entity) where UL resource is allocated (e.g. bandwidth part (BWP), cell)
Others In addition to such elements, other elements may be considered to prescribe the UL resource. As an example where the feature of UL resource is classified using an index among the above elements, the set of MCS level is configured as "MCS Set 1" for a normal quality service or "MCS Set 2" for a service requiring a robust quality. If an MCS level for a terminal is merely configured as "MCS Level 5," it is difficult for the terminal to determine for which service the corresponding MCS level is. Accordingly, if UL resource is classified based on an index, the terminal can determine that "Index 1" corresponds to a normal quality service, and that "Index 2" corresponds to a service requiring a robust quality.

The base station may define a combination of the above-described elements as in table 1 below, and may give one index with respect to each combination. Table 1 below corresponds to one example.

TABLE 1

| Index | Numerology (subcarrier spacing) | TTI duration |
|---|---|---|
| 1 | 60 kHz | 1 ms |
| 2 | 60 kHz | 0.5 ms |
| 3 | 60 kHz | 0.25 ms |
| 4 | 30 kHz | 1 ms |
| 5 | 30 kHz | 0.5 ms |
| 6 | 30 kHz | 0.25 ms |
| 7 | 15 kHz | 1 ms |
| 8 | 15 kHz | 0.5 ms |
| 9 | 15 kHz | 0.25 ms |

Next, the base station notifies the terminal what characteristics the UL grant currently allocated by the base station indicates the UL resource having by including index information defined as described above in the UL grant when the base station allocates the UL resource to the terminal. Table 2 below illustrates the UL grant contents that the base station allocates to the terminal.

TABLE 2

| UL grant | Number of bits |
|---|---|
| Format 0/format 1A flag | 1 |
| Hopping flag | 1 |
| Resource block allocation | 5~13 |
| MCS and redundancy version | 5 |
| New data indicator | 1 |
| TPC command | 2 |
| Cyclic shift for DM-RS | 3 |
| CQI request | 1 |
| Padding | 1~2 |
| Proposed index (e.g., if an index is 9, the corresponding UL resource is 0.5 ms at 30 kHz) | N |

Further, when the base station provides logical channel configuration information to the terminal, the base station may provide logical channel priority for each index proposed in the present disclosure. This is performed through the following LogicalChannelConfig information element.

```
- LogicalChannelConfig
The IE LogicalChannelConfig is used to configure the logical channel parameters.
            LogicalChannelConfig information element
-- ASN1START
LogicalChannelConfig ::=        SEQUENCE {
    ul-SpecificParameters           SEQUENCE {
        priorityForIndex1               INTEGER (1..16),
        priorityForIndex2               INTEGER (1..16),
        priorityForIndex3               INTEGER (1..16),
        ...
        priorityForIndexN               INTEGER (1..16),
        prioritisedBitRate              ENUMERATED {
                                            kBps0, kBps8, kBps16, kBps32,
kBps64, kBps128,
                                            kBps256, infinity, kBps512-v1020,
kBps1024-v1020,
                                            kBps2048-v1020, spare5, spare4,
spare3, spare2,
                                            spare1},
        bucketSizeDuration              ENUMERATED {
                                            ms50, ms100, ms150, ms300, ms500,
ms1000, spare2,
                                            spare1},
        logicalChannelGroup             INTEGER (0..3)        OPTIONAL
    }        OPTIONAL,
    ...,
    [[ logicalChannelSR-Mask-r9        ENUMERATED {setup}
    OPTIONAL       -- Cond SRmask
    ]],
```

-continued

```
[[  logicalChannelSR-Prohibit-r12      BOOLEAN
OPTIONAL         -- Need ON
]]
}
-- ASN1STOP
```

Figure 18:
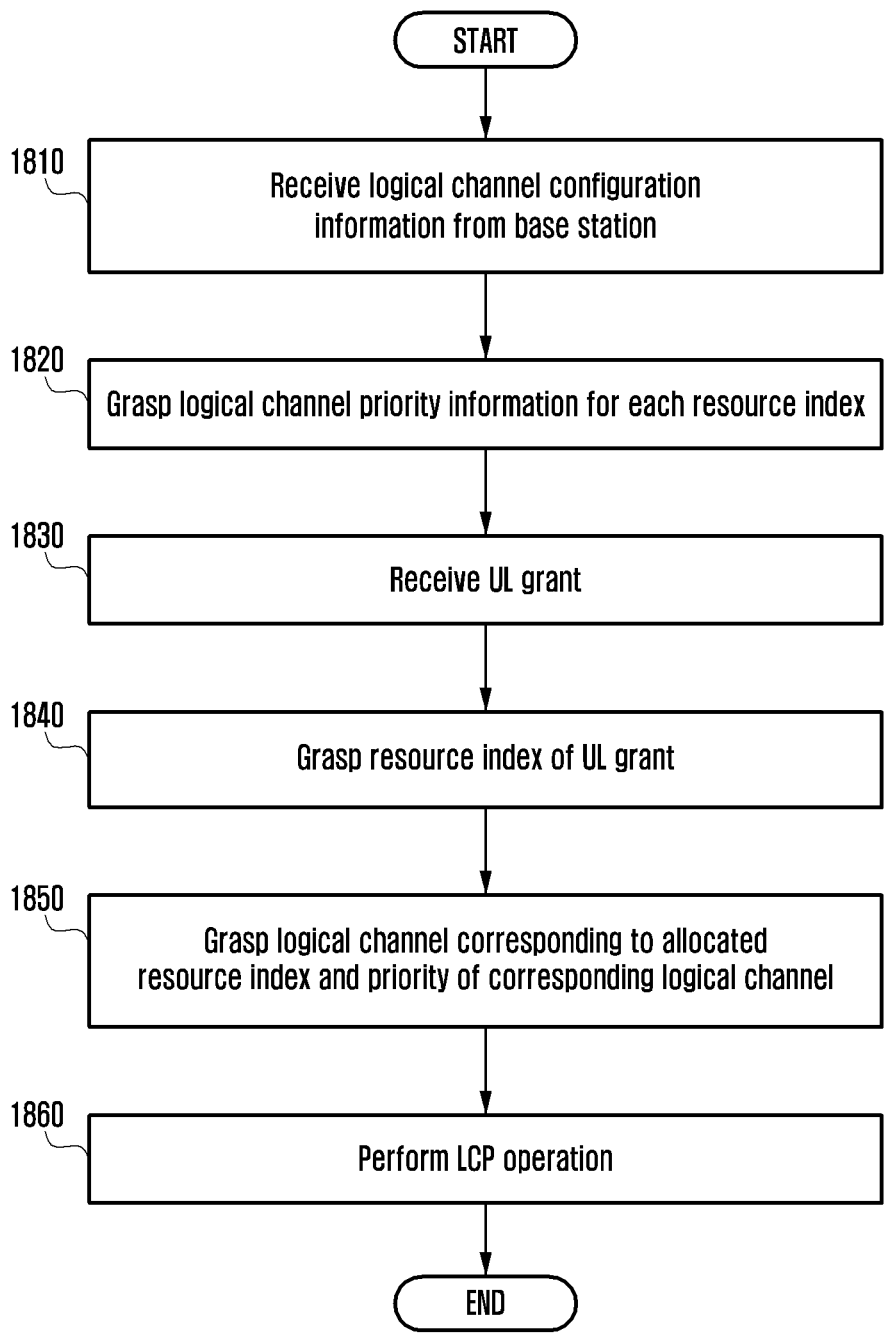
FIG. 18 is a diagram illustrating an LCP scheme based on a resource index proposed in the present disclosure.

FIG. 18 is a diagram illustrating an LCP scheme based on a resource index in accordance with the present disclosure.

Referring to FIG. 18, a terminal receives information on a logical channel configuration from a base station at operation 1810. For example, the information on a logical channel configuration may be included in a logical channel information element (IE) transmitted in a RRC message. The terminal identifies logical channel priority information for each resource index at operation 1820. If a UL grant is allocated at operation 1830, the terminal identifies an index proposed in the present disclosure at operation 1840. Next, the terminal identifies a logical channel and a logical channel priority corresponding to the corresponding index at operation 1850. Thereafter, the terminal performs the LCP operation based on the corresponding logical channel priority with respect to the corresponding logical channel at operation 1860.

Figure 19:
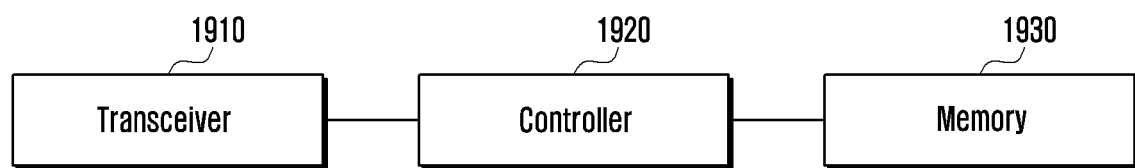
FIG. 19 is a diagram illustrating the structure of a terminal according to an embodiment of the present disclosure.

FIG. 19 is a diagram illustrating the structure of a terminal according to an embodiment of the present disclosure.

Referring to FIG. 19, the terminal may include a transceiver 1910, a controller 1920, and a storage 1930. In the present disclosure, the controller may be defined as a circuit, an application-specific integrated circuit, or at least one processor.

The transceiver 1910 may transmit/receive signals with other network entities. The transceiver 1910 may receive system information from the base station, and may receive a sync signal or a reference signal.

The controller 1920 may control the overall operation of the terminal according to an embodiment proposed in the present disclosure. For example, the controller 1920 may control signal flow between respective blocks to perform the operation according to the above-described flowchart. Specifically, the controller 1920 may select an LCH for LCP performance according to an embodiment of the present disclosure. In accordance with an aspect of the present disclosure, the controller 1920 may be configured to control the transceiver 1910 to receive information on mapping restrictions for a plurality of logical channels and an uplink grant from the base station, select a logical channel from the plurality of logical channels based on the information on mapping restrictions and the UL grant, and control the transceiver 1910 to transmit uplink data based on the selected logical channel to the base station. The information on mapping restrictions for each logical channel may refer to the logical channel configuration information including at least one of information on numerology, TTI duration, or MCS level for the plurality of the logical channels.

The storage 1930 may store at least one of information transmitted/received through the transceiver 1910 and information generated through the controller 1920.

Figure 20:
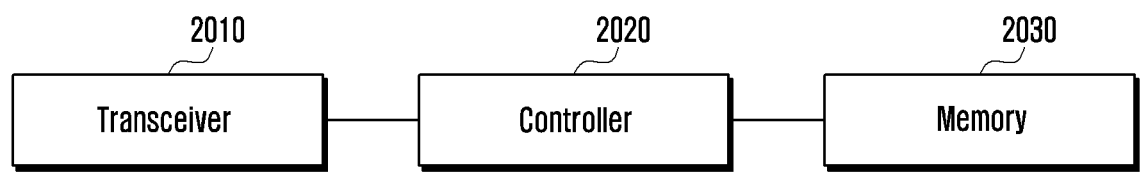
FIG. 20 is a diagram illustrating the structure of a base station according to an embodiment of the present disclosure.

FIG. 20 is a diagram illustrating the structure of a base station according to an embodiment of the present disclosure.

Referring to FIG. 20, the base station may include a transceiver 2010, a controller 2020, and a storage 2030. In the present disclosure, the controller may be defined as a circuit, an application-specific integrated circuit, or at least one processor.

The transceiver 2010 may transmit/receive signals with other network entities. The transceiver 2010 may receive system information from the terminal, and may receive a sync signal or a reference signal.

The controller 2020 may control the overall operation of the terminal according to an embodiment proposed in the present disclosure. For example, the controller 2020 may control signal flow between respective blocks to perform the operation according to the above-described flowchart. In accordance with an aspect of the present disclosure, the controller 2020 may be configured to control the transceiver 2010 to transmit information on mapping restrictions for a plurality of logical channels and an UL grant to the terminal, and control the transceiver 2010 to receive uplink data based on a logical channel. The logical channel is selected from the plurality of logical channels based on the information on mapping restrictions and the UL grant.

The storage 2030 may store at least one of information transmitted/received through the transceiver 2010 and information generated through the controller 2020.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a terminal for transmitting uplink (UL) data in a wireless communication system, the method comprising:
   receiving, from a base station, a control message including information restriction on each of a plurality of logical channels, each of the information restriction including information on a subcarrier spacing for a transmission, information on duration for the transmission, information on a serving cell for the transmission, and information on a priority index;
   receiving, from the base station, an UL grant including a priority indicator;
   selecting a logical channel from the plurality of logical channels based on the information on the subcarrier spacing for the transmission, the information on the duration for the transmission, the information on the serving cell for the transmission, the information on the priority index included in each of the restriction information and the UL grant including the priority indicator; and
   transmitting, to the base station, UL data based on the selected logical channel,
   wherein it is identified whether the priority index included in each of the restriction information corresponds to the priority indicator included in the UL grant for selecting the logical channel.

2. The method of claim 1, wherein the subcarrier spacing associated with the selected logical channel corresponds to a subcarrier spacing associated with the UL grant.

3. The method of claim 1, wherein the duration for the transmission associated with the selected logical channel is larger than or equal to a duration for the transmission associated with the UL grant.

4. The method of claim 1, wherein the information on mapping restrictions further includes information on modulation and coding scheme (MCS) level for the plurality of logical channels.

5. The method of claim 1, wherein the selecting of the logical channel includes:
   identifying a bucket size of the plurality of the logical channels; and
   selecting the logical channel based on the bucket size to apply a logical channel prioritization.

6. A method of a base station for receiving uplink (UL) data in a wireless communication system, the method comprising:
   transmitting, to a terminal, a control message including information restriction on each of a plurality of logical channels, each of restriction information including information on a subcarrier spacing for a transmission, information on duration for the transmission, information on a serving cell for the transmission, and information on a priority index;
   transmitting, to the terminal, an UL grant including a priority indicator; and
   receiving, from the terminal, UL data based on a logical channel selected from the plurality of logical channels based on the information on the subcarrier spacing for the transmission, the information on the duration for the transmission, the information on the serving cell for the transmission, the information on the priority index included in each of the restriction information and the UL grant including the priority indicator,
   wherein it is identified whether the priority index included in each of the restriction information corresponds to the priority indicator included in the UL grant for selecting logical channel.

7. The method of claim 6, wherein the subcarrier spacing associated with the selected logical channel corresponds to a subcarrier spacing associated with the UL grant, or the duration for the transmission associated with the selected logical channel is larger than or equal to a duration for the transmission associated with the UL grant.

8. The method of claim 6, wherein the information on mapping restrictions further includes information on modulation and coding scheme (MCS) level for the plurality of logical channels.

9. A terminal for transmitting uplink (UL) data in a wireless communication system, the terminal comprising:
   a transceiver; and
   a controller configured to:
      receive, from a base station via the transceiver, a control message including restriction information on each of a plurality of logical channels, each of the restriction information including information on a subcarrier spacing for a transmission, information on duration for the transmission, information on a serving cell for the transmission, and information on a priority index,
      receive, from the base station via the transceiver, an UL grant including a priority indicator,
      select a logical channel from the plurality of logical channels based on the information on the subcarrier spacing for the transmission, the information on the duration for the transmission, the information on the serving cell for the transmission, the information on the priority index included in each of the restriction information and the UL grant including the priority indicator, and
      transmit, to the base station via the transceiver, UL data based on the selected logical channel,
   wherein it is identified whether the priority index included in each of the restriction information corresponds to the priority indicator included in the UL grant for selecting the logical channel.

10. The terminal of claim 9, wherein the subcarrier spacing associated with the selected logical channel corresponds to a subcarrier spacing associated with the UL grant.

11. The terminal of claim 9, wherein the duration for the transmission associated with the selected logical channel is larger than or equal to a duration for the transmission associated with the UL grant.

12. The terminal of claim 9, wherein the information on mapping restrictions further includes information on modulation and coding scheme (MCS) level for the plurality of logical channels.

13. The terminal of claim 9, wherein the controller is further configured to select the logical channel by:
   identifying a bucket size of the plurality of the logical channels, and
   selecting the logical channel based on the bucket size to apply a logical channel prioritization.

14. A base station for receiving uplink (UL) data in a wireless communication system, the base station comprising:
   a transceiver; and
   a controller configured to:
      transmit, to a terminal via the transceiver, a control message including restriction information on each of a plurality of logical channels, each of the restriction information including information on a subcarrier spacing for a transmission, information on duration for the transmission, information on a serving cell for the transmission, and information on a priority index,
      transmit, to the terminal, an UL grant including a priority indicator, and
      receive, from the terminal, UL data based on a logical channel selected from the plurality of logical channels based on the information on the subcarrier spacing for the transmission, the information on the duration for the transmission, the information on the serving cell for the transmission, the information on the priority index included in each of the restriction information and the UL grant including the priority indicator,
   wherein it is identified whether the priority index included in each of the restriction information corresponds to the priority indicator included in the UL grant for selecting logical channel.

15. The base station of claim 14, wherein the subcarrier spacing associated with the selected logical channel corresponds to a subcarrier spacing associated with the UL grant, or the duration for transmission associated with the selected logical channel is larger than or equal to a duration for transmission associated with the UL grant.

16. The base station of claim 14, wherein the information on mapping restrictions further includes information on modulation and coding scheme (MCS) level for the plurality of logical channels.

* * * * *